United States Patent
Maxson

(10) Patent No.: US 12,084,158 B2
(45) Date of Patent: Sep. 10, 2024

(54) METHOD AND APPARATUS FOR EFFECTING RESCUE OF PERSONS OR ANIMALS CAUGHT IN OPEN HYDRAULIC CHANNELS

(71) Applicant: David P. Maxson, Medfield, MA (US)

(72) Inventor: David P. Maxson, Medfield, MA (US)

( * ) Notice: Subject to any disclaimer, the term of this patent is extended or adjusted under 35 U.S.C. 154(b) by 161 days.

(21) Appl. No.: 17/990,093

(22) Filed: Nov. 18, 2022

(65) Prior Publication Data

US 2023/0159142 A1    May 25, 2023

Related U.S. Application Data

(60) Provisional application No. 63/281,787, filed on Nov. 22, 2021.

(51) Int. Cl.
*B63C 9/26* (2006.01)
*A01K 29/00* (2006.01)

(52) U.S. Cl.
CPC ............ *B63C 9/26* (2013.01); *A01K 29/00* (2013.01); *B63C 2009/265* (2013.01)

(58) Field of Classification Search
CPC ...... B63C 9/26; B63C 2009/265; A01K 29/00
See application file for complete search history.

(56) References Cited

U.S. PATENT DOCUMENTS

| | | | | |
|---|---|---|---|---|
| 5,370,565 | A * | 12/1994 | Yanez | B63C 9/26 441/80 |
| 5,484,313 | A | 1/1996 | Rachal et al. | |
| 6,641,446 | B1 * | 11/2003 | Bentley | B63C 9/32 280/19 |
| 6,899,582 | B1 | 5/2005 | Hayles | |
| 7,344,426 | B1 | 3/2008 | Dysthe | |
| 8,496,507 | B2 * | 7/2013 | Poston | B63H 19/04 441/80 |
| 2004/0060115 | A1 * | 4/2004 | Panton, Jr. | A61B 6/0442 5/601 |

FOREIGN PATENT DOCUMENTS

| | | | | |
|---|---|---|---|---|
| CN | 101909981 A | * | 12/2010 | ............. B63B 35/73 |
| CN | 107150774 A | * | 9/2017 | ............... B63C 9/00 |
| KR | 20090099382 | | 9/2009 | |

* cited by examiner

*Primary Examiner* — Andrew Polay
(74) *Attorney, Agent, or Firm* — Pandiscio & Pandiscio

(57) ABSTRACT

Apparatus for facilitating recovery of objects from a hydraulic channel containing a flowing fluid, the apparatus comprising: a porous planar surface for disposition within the hydraulic channel, the porous planar surface being elevated in the direction of flow in the hydraulic channel at an angle to a plane extending normal to the force of gravity such that the horizontal component of the angle of elevation is greater than the vertical component thereof; wherein the porous planar surface is configured to permit the fluid flowing in the hydraulic channel to flow through the porous planar surface without materially obstructing the flow of the fluid in the hydraulic channel.

18 Claims, 27 Drawing Sheets

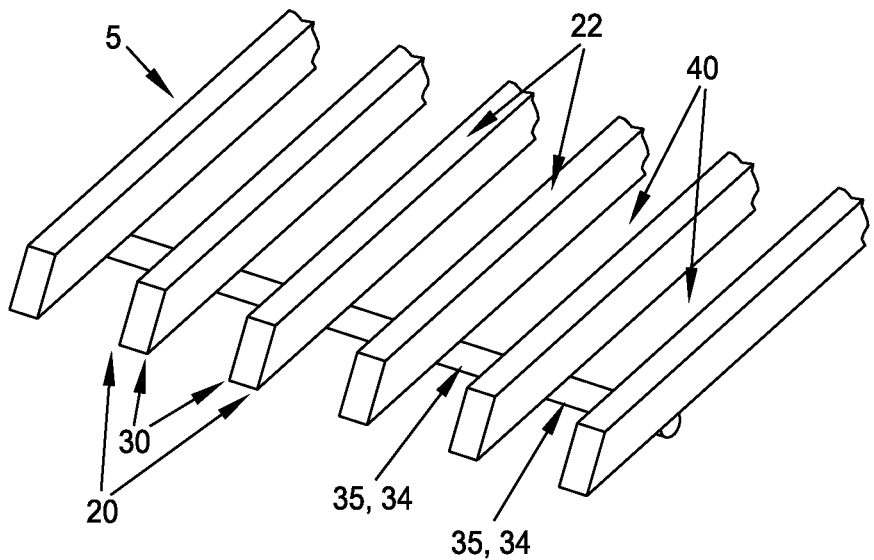
RASIED GLIDE SURFACES ON RAISED GLIDE STRUCTURES COMPRISING A GRATE AS THE POROUS SURFACE
POROSITY IN GRATE SPACINGS. CROSSTIES BELOW TOPS OF RAISED GLIDE SURFACES
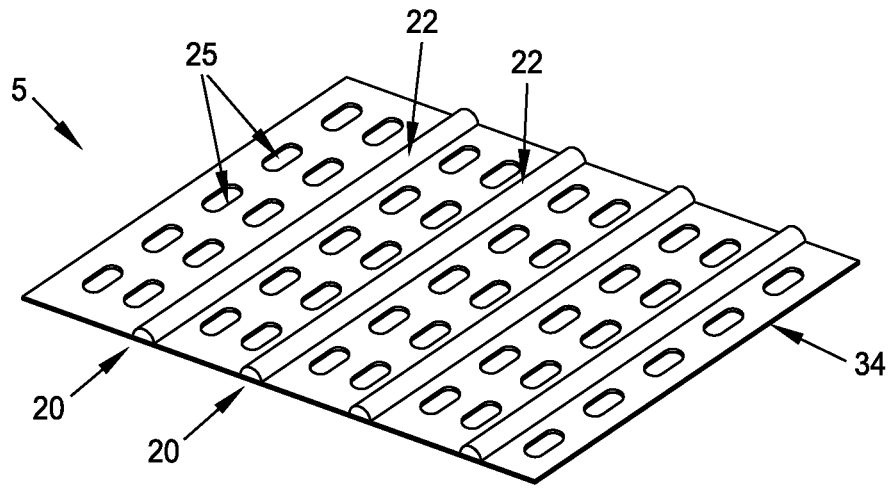
CONCEPT OF RAISED GLIDE SURFACES ON RAISED GLIDE STRUCTURES PROJECTING ABOVE POROUS SURFACE
CONCEPT OF POROSITY ILLUSTRATED AS PERFORATIONS BELOW RAISED GLIDE SURFACES
FIG. 2

CURVED VARIABLE PITCH EXAMPLE SIDEVIEW

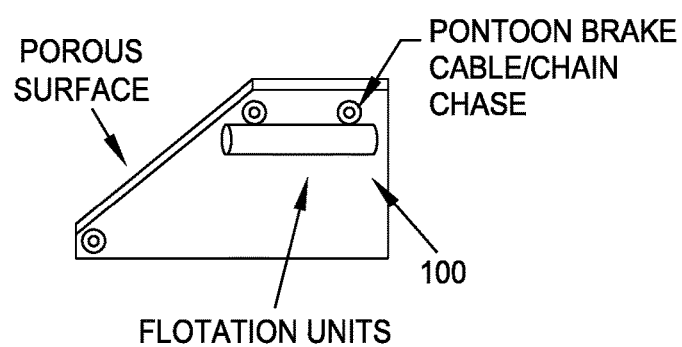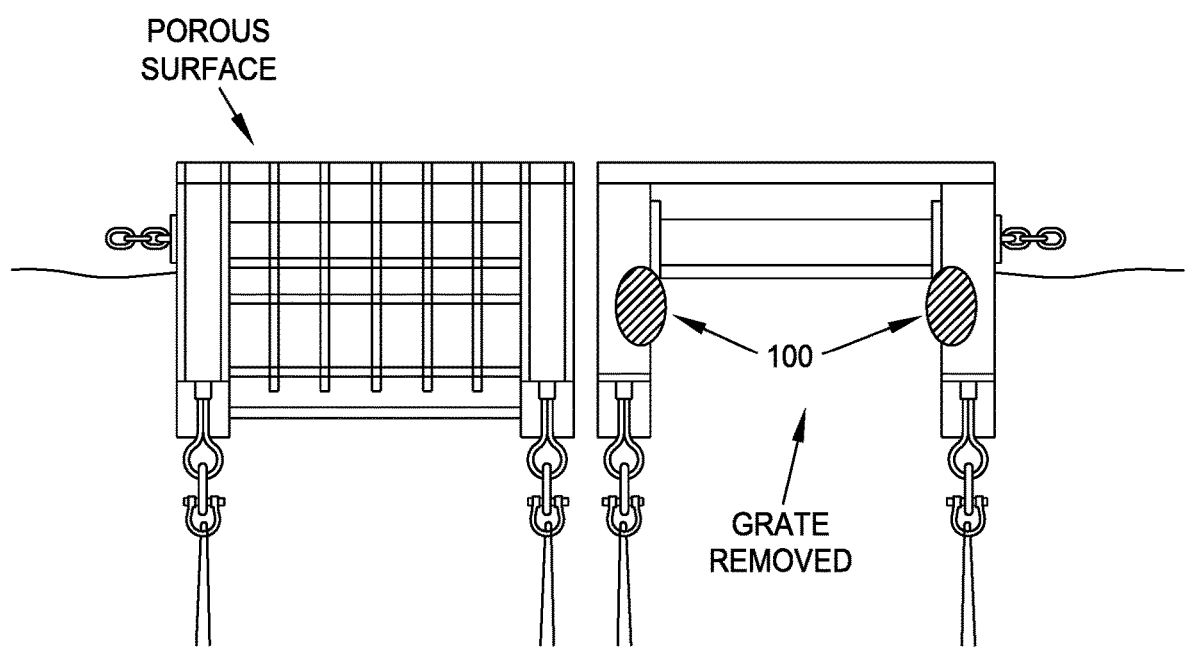
FIG. 14

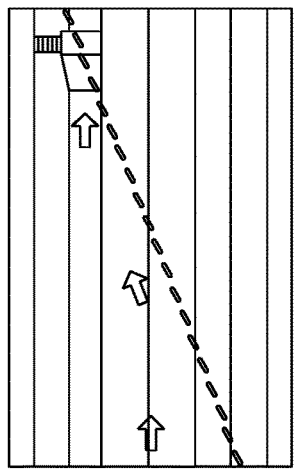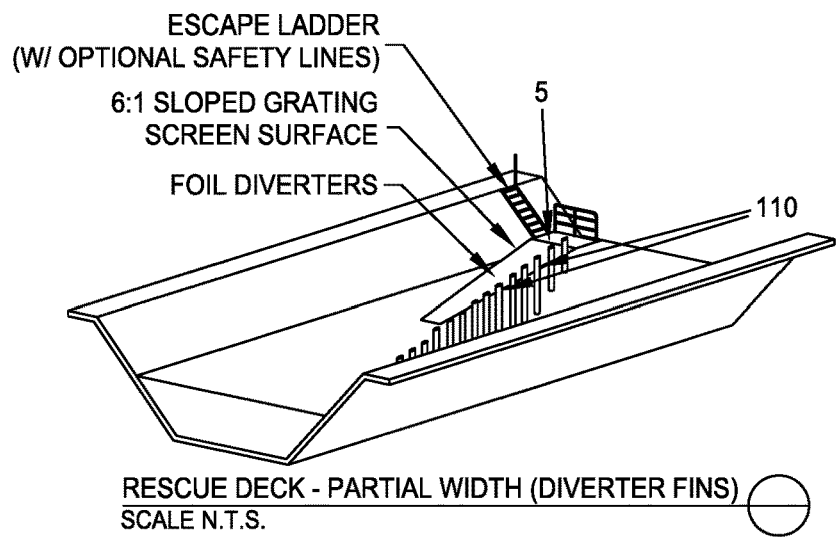
RESCUE DECK - PARTIAL WIDTH (DIVERTER FINS)
SCALE N.T.S.
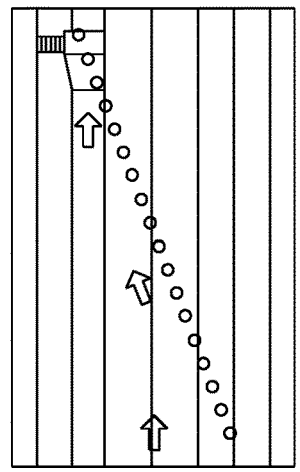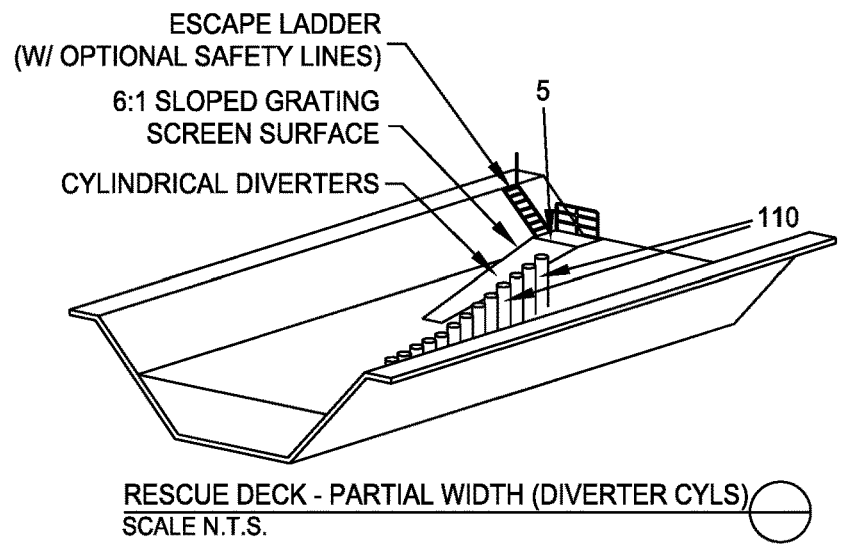
RESCUE DECK - PARTIAL WIDTH (DIVERTER CYLS)
SCALE N.T.S.
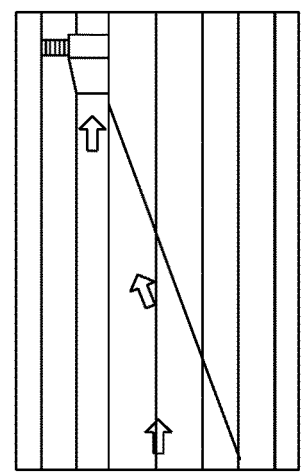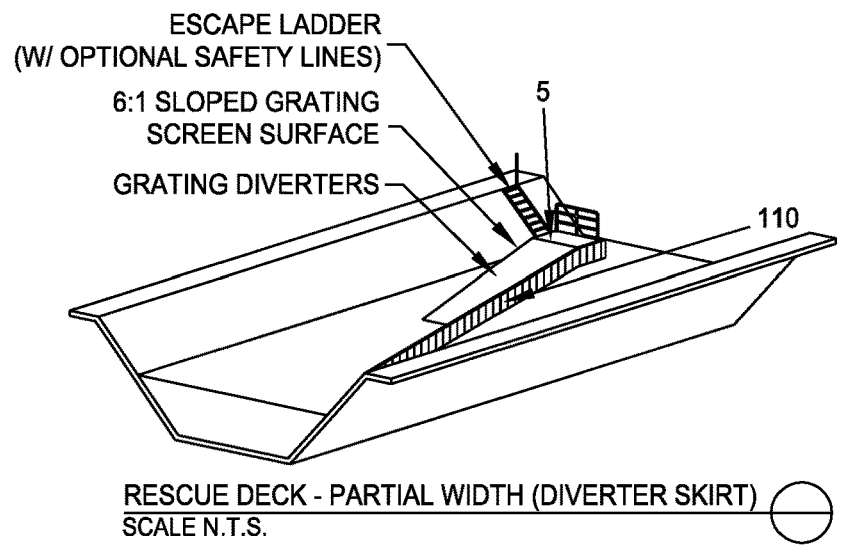
RESCUE DECK - PARTIAL WIDTH (DIVERTER SKIRT)
SCALE N.T.S.
FIG. 16

EXAMPLE INFORMATION FOR VICTIMS

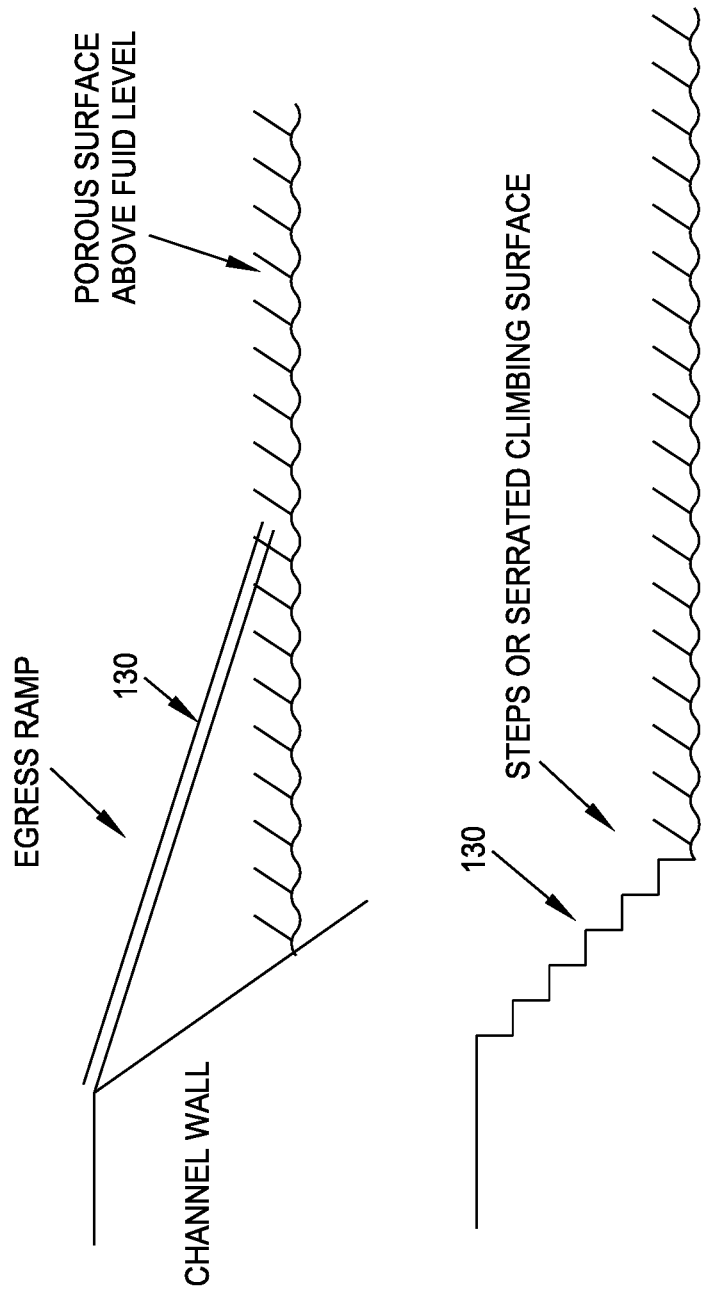

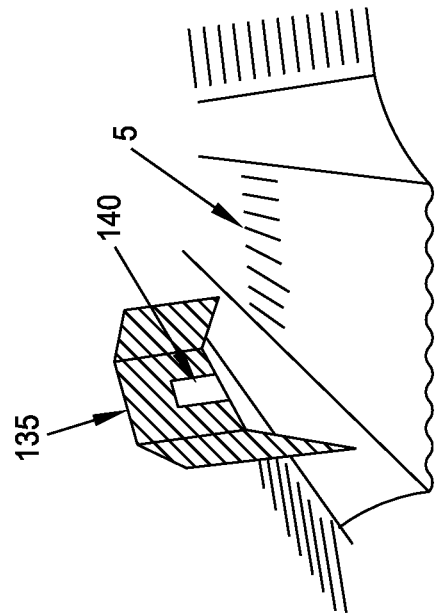
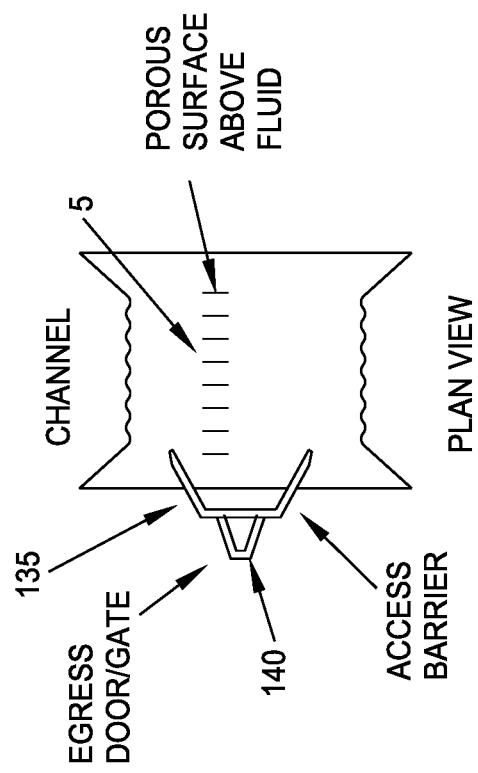
FIG. 22

CROSS SECTION AT TRAILING EDGE

APPARATUS COLLAPSED TO CHANNEL SURFACES

HOISTING MECHANISM LICATIONS

METHOD AND APPARATUS FOR EFFECTING RESCUE OF PERSONS OR ANIMALS CAUGHT IN OPEN HYDRAULIC CHANNELS

REFERENCE TO PENDING PRIOR PATENT APPLICATION

This patent application claims benefit of prior U.S. Provisional Patent Application Ser. No. 63/281,787, filed Nov. 22, 2021 by David Maxson for METHOD AND APPARATUS FOR EFFECTING RESCUE OF PERSONS OR ANIMALS CAUGHT IN OPEN HYDRAULIC CHANNELS.

The above-identified patent application is hereby incorporated herein by reference.

FIELD OF THE INVENTION

This invention relates to safety apparatus in general, and more particularly to novel methods and apparatus for effecting rescue of persons or animals caught in hydraulic channels (e.g., canals) characterized by high flow rates.

BACKGROUND OF THE INVENTION

Open hydraulic channels characterized by fast flowing currents present a considerable hazard to persons and animals in the area of the open hydraulic channel, and are often the cause of drowning and near-drowning. By way of example but not limitation, the U.S. Bureau of Reclamation is responsible for approximately 8000 miles of irrigation canals of various sizes located in the western USA. The rate of flow of such irrigation canals can be substantial, often measuring in single-digit feet per second (fps). For example, canals having a flow rate of approximately four fps (1.2 m/s) is common during regular operation. Such a flow rate corresponds to approximately 2.7 MPH (4.4 km/h), which is generally impossible for a human (except for a competitive swimmer, who might be able to swim up to 6 MPH) or animal caught in the flow to swim against for more than brief durations, and it is very difficult for the person or animal attempting to escape the flow to resist the current when attempting to climb out of the hydraulic channel (e.g., a canal). Even the situation of a hydraulic channel that has a fluid depth that is not deep enough to be over the head of the victim is dangerous, as the flow will repeatedly sweep victims off their feet. If the hydraulic channel has a low bank, the victim caught in the flow may be able to walk or clamber out of the hydraulic channel against the force of the current. However, steep and/or high banks may not give the victim the necessary purchase to climb out while resisting the flow. Moreover, banks sloped even at a 3:1 (horizontal to vertical ratio) are difficult for persons or animals to climb to escape. This is especially so when the sloped or vertical bank is a smooth planar manufactured surface, such as is the case with many irrigation canals.

Once a person or animal has been caught in the flow of a hydraulic channel, rescuers are burdened with the task of identifying the location of the victim and arriving downstream of the victim before the victim gets to that downstream point. There exist various kinds of rescue apparatus, typically rescue apparatus that is carried by, and deployable by, rescue personnel. By way of example but not limitation, "classic" lifesaving rings on long lines can be posted at accessible spots along the open hydraulic channel to provide for rapid reaction by a nearby volunteer rescuer. However, it will be appreciated, that when the rescuer is attempting to rescue a person caught in the flow using a flotation device attached to a line, the rescuer may be put in danger if not properly trained and equipped to prevent being pulled into the channel by the floating/distressed victim caught in the flow. And the rescuer generally has only one opportunity to connect with the person caught in the flow (e.g., by throwing the flotation device near enough to the person caught in the flow to be grabbed by the person) before the person passes the rescue point. Furthermore, such "lifesaving ring" style rescue apparatus are entirely useless for effecting the rescue of an animal caught in the flow (because an animal generally cannot grasp the flotation device).

Rescuers often have no choice but to enter the fluid flowing in the hydraulic channel, protected by such means as inflatable motorized boats or personal flotation garments and tethers to shore. These methods substantially increase the risk to the rescuer and require precious time to deploy.

Other rescue apparatus is typically mobile (e.g., carried by first responders), and must be delivered by first responders to a staging location downstream of the victim caught in the flow. Where mobile rescue apparatus is to be used, the equipment must be standing relatively close by, and rescuers (e.g., first responders) need to retrieve the mobile rescue apparatus, move it into position, and successfully deploy the mobile rescue apparatus before the victim caught in the flow passes by the staging location.

By way of example, one such mobile rescue apparatus is disclosed in U.S. Pat. No. 6,899,582 titled "Swift Water Advanced Rescue Device". The rescue device disclosed in U.S. Pat. No. 6,899,582 expands on prior art rescue apparatus that rely on rope nets to provide surfaces to capture victims and to provide ropes for victim (and rescuer) to grasp. More particularly, the rescue device of U.S. Pat. No. 6,899,582 provides a portable attachment means for attaching quickly to a structure disposed above the flowing water (e.g., a bridge) and deploying a wide span of vertically disposed nets downstream of the victim caught in the flow. Victims therefore must be able to grab the net and hold onto the net until rescued.

By way of further example, U.S. Pat. No. 7,344,426 titled "System for Rescuing a Person from a Body of Water" discloses a truck-mounted spool having a climbing net wound onto it, and an apparatus configured to extend the net outboard of the side of a bridge so as to cause it to drape into the flowing water. This solution is expensive, requires specialized equipment, and involves time-consuming setup and operation. Additionally, and as was the case with the rescue device of U.S. Pat. No. 6,899,582 discussed above, the rescue device of U.S. Pat. No. 7,344,426 also requires an able (i.e., conscious and having the strength and dexterity to perform necessary actions and the cognitive capacity to react to rescuer instructions) victim to grasp the net and climb out of the current (or for rescuers to themselves use the net to enter the flow and retrieve the victim from the vertical net).

It will be appreciated that victims caught in the flow may not only be less than ideally physically fit to perform a self-rescue (or to assist rescuers with their rescue), but also, that immersion in cold water induces hypothermia, which can severely diminish the strength and mental capacity of even the most fit person, especially if not rescued immediately after immersion.

Animals, in their own way, suffer from the same limitations as humans with respect to performing a self-rescue or assisting/following the directions of rescuers. Most animals lack the physical ability to climb a vertical net or ladder. While flotation devices (e.g., lifesaving rings) might be useful for smaller animals with the perceptual capacity to recognize them as flotation devices, many animals do not possess such mental acuity or the appropriate agility. Furthermore, unconscious (or otherwise incapacitated) humans or animals must be saved by active rescuers who are both perfectly timed and positioned to intercept them.

Ladders or stairs positioned periodically along the hydraulic channel can be of assistance if the victim caught in the flow is able to navigate along the side of the hydraulic channel and take hold of the ladder as they move swiftly by. However, in the context of a life-threatening event such as being caught in a flowing current, the victim may panic and lose the cognitive ability to participate effectively in their rescue or may be otherwise unable to navigate to the side of the hydraulic channel and arrest their movement by grasping an available structure.

Apparatus serving the hydraulic channel for operational reasons (e.g., turbines, diverters, plunge pools, culverts, siphons, etc.) are often protected by bars and grates intended to prevent materials (e.g., debris and animals) from entering the apparatus. Other than floating boom arrangements configured to capture floating debris, such features are generally vertically disposed bars or grates, and are not configured for convenience of recovery or rescue of humans or animals. For example, trash collection points (e.g., generally vertically disposed grates) are ideally disposed at angles of 5 to 30 degrees off vertical, whereby to minimize the area requiring clearing, and are often equipped with automatic or manual apparatus to rake off the debris in a vertical lifting action. Such generally vertically disposed grates are not configured for humans or animals to climb vertically so as to escape the flow, and the function of the generally vertical disposition is to pin objects to the surface of the grate until they are removed, which can include being pinned beneath the surface of the fluid resulting in an increased risk of drowning for a human or animal pinned in such a way.

Disturbing the flow with more complex and cumbersome apparatus for rescue purposes can reduce the function or efficiency of the hydraulic channel, hence, such apparatus is generally not available or installed in existing hydraulic channels. Thus, there exists a need for new and improved methods and apparatus for effecting rescue of humans or animals caught in the flow of a hydraulic channel that does not suffer from the limitations of prior art rescue apparatus.

SUMMARY OF THE INVENTION

The present invention comprises the provision and use of novel methods and apparatus for effecting rescue of humans or animals caught in the flow of a hydraulic channel that does not suffer from the limitations of prior art rescue apparatus.

More particularly, the present invention generally comprises rescue apparatus configured to be immersed in the flow of the fluid (e.g., water) in the hydraulic channel (e.g., canal) which is designed to minimize disturbances (e.g., interference with the flow rate or head of the fluid in the hydraulic channel). Moreover, the novel methods and apparatus of the present invention may utilize the force of the flow of the fluid itself so as to lift (or drive/push) the victim to safety.

It will be appreciated that rescue apparatus comprising moving parts may be subject to "wear and tear", and could be in disabled condition when needed. Joints, pivots, sliders and other moving parts can also corrode and seize, or be jammed by foreign debris, or be damaged by various kinds of impacts, among other issues. Accordingly, the novel methods and apparatus of the present invention are configured to address such considerations.

Specifically, the present invention comprises the provision and use of novel apparatus which enables rescue and recovery of humans (and animals) caught in open hydraulic channels by establishing a surface having a plane that is more horizontal than vertical, whereby to provide a surface to "glide" victims out of the flow. The surface is configured to have a porosity that reduces the obstruction of the flow of the fluid in the hydraulic channel to a degree that is acceptable to the operational requirements of the hydraulic channel. Permanent placement of the planar surface of the present invention in the fluid flow of the hydraulic channel eliminates lead time necessary to position mobile rescue apparatus (such as is necessary with the prior art mobile rescue apparatus discussed above) and enables passive rescue of the victim caught in the flow, even if the victim lacks the ability to contribute substantial effort to self-rescue. Alternatively, it will also be appreciated that, if minimizing obstruction to the flow is critical to operation of the hydraulic channel, the apparatus of the present invention may be pre-positioned outside the flow, and then inserted into the flow on demand, with the corresponding reduction in availability, operational efficiency and effectiveness of rescue. Conversely, certain elements of the novel apparatus of the present invention may be permanently installed in the hydraulic channel, and the porous surface may be disposed on the bottom of the hydraulic channel so as to be selectively pivoted up into position when required to effect a rescue.

In one preferred form of the present invention, there is provided apparatus for facilitating recovery of objects from a hydraulic channel containing a flowing fluid, said apparatus comprising:

a porous planar surface for disposition within the hydraulic channel, said porous planar surface being elevated in the direction of flow in the hydraulic channel at an angle to a plane extending normal to the force of gravity such that the horizontal component of said angle of elevation is greater than the vertical component thereof;

wherein said porous planar surface is configured to permit the fluid flowing in the hydraulic channel to flow through said porous planar surface without materially obstructing the flow of the fluid in the hydraulic channel.

In another preferred form of the present invention, there is provided apparatus for facilitating recovery of objects from a hydraulic channel containing a flowing fluid, said apparatus comprising;

a first porous planar surface for disposition within the hydraulic channel; and a second porous planar surface for disposition within the hydraulic channel;

wherein the first porous planar surface and the second porous planar surface are each configured to permit the fluid flowing in the hydraulic channel to flow through said first porous planar surface and said second porous planar surface without obstructing the flow of the fluid in the hydraulic channel; and wherein at least one of said first porous planar surface and said second porous planar surface are elevated in the direction of flow at an angle relative to a plane extending normal to the force of gravity such that the horizontal component of said angle of elevation of said at least one of said first porous planar surface and said angle of elevation of said second porous planar surface are greater than the vertical dimension of said angle of elevation of said at least one of said first porous planar surface and said angle of elevation of said second porous planar surface, respectively.

In another preferred form of the present invention, there is provided a method for recovering objects from a hydraulic channel containing a flowing fluid, said method comprising:

providing apparatus comprising:

a porous planar surface for disposition within the hydraulic channel, said porous planar surface being tilted relative to a plane extending normal to the force of gravity such that the horizontal dimension of said angle of elevation of said porous planar surface relative to the direction of flow in the hydraulic channel is greater than the vertical dimension of said angle of elevation of said porous planar surface;

wherein said porous planar surface is configured to permit the fluid flowing in the hydraulic channel to flow through said porous planar surface without materially obstructing the flow of the fluid in the hydraulic channel;

disposing said apparatus in the hydraulic channel such that an upstream end of said porous planar surface is situated below a center of buoyancy of an object carried by the flowing fluid, and such that a downstream end of said porous planar surface is situated proximate the surface of the flowing fluid in the hydraulic channel;

wherein said angle of elevation of said porous planar surface is less than 10 degrees above said plane extending normal to the force of gravity.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 2 is a schematic view showing details of glide surfaces formed in accordance with the present invention, wherein the raised glide surfaces are formed at the top of raised glide structures that are aligned with flow revealing gaps between and recessed cross-components, with two constructions being depicted: a) a grate, with integral raised glide structures (i.e., longitudinal load bars) and b) a porous plate with raised glide structures;

FIG. 14 is a schematic view showing floating apparatus formed in accordance with the present invention;

FIG. 16 is a schematic view illustrating a plurality of exemplary diverter schemes for use with the present invention;

FIG. 21 is a schematic view illustrating exemplary egress surfaces;

FIG. 22 is a schematic view showing an exemplary access control fence formed in accordance with the present invention;

DETAILED DESCRIPTION OF THE PREFERRED EMBODIMENTS

The novel rescue apparatus of the present invention provides new and improved methods and apparatus for enabling capture and recovery (self-rescue and aided rescue) of persons or animals caught in open hydraulic channels having fluid flowing therein.

More particularly, the novel method for effecting rescue of a person or animal caught in the flow of a hydraulic channel comprises placing apparatus comprising a novel porous surface in an open hydraulic channel disposed at a pitch that is more-horizontal-than-vertical, wherein the inclination of the porous surface is oriented generally in the direction of flow such that the upstream end (i.e., the leading edge) of the porous surface is at a sufficient depth so as to enable the force of the flow of the fluid in the channel to "push" the human or animal caught in the fluid of the channel onto the top side of the porous surface and upwards along the surface.

Figure 1:
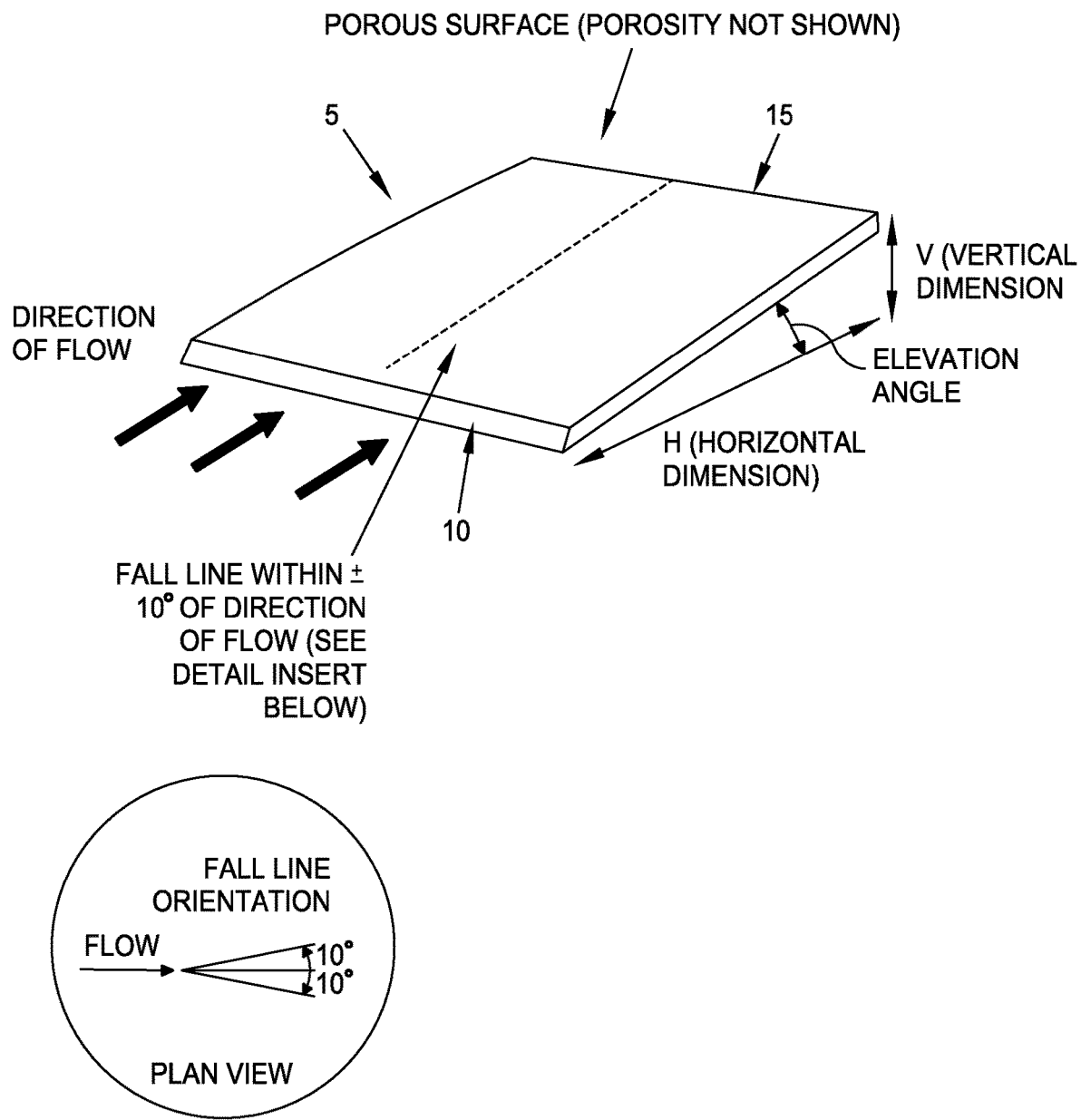
FIG. 1 is a schematic view showing a porous surface formed in accordance with the present invention, wherein characteristics of flow, pitch, horizontal and vertical dimensions (H&V), fluid level, extension above waterline, and fall-line within 10 degrees of angle of flow are demonstrated.
Figure 1A:
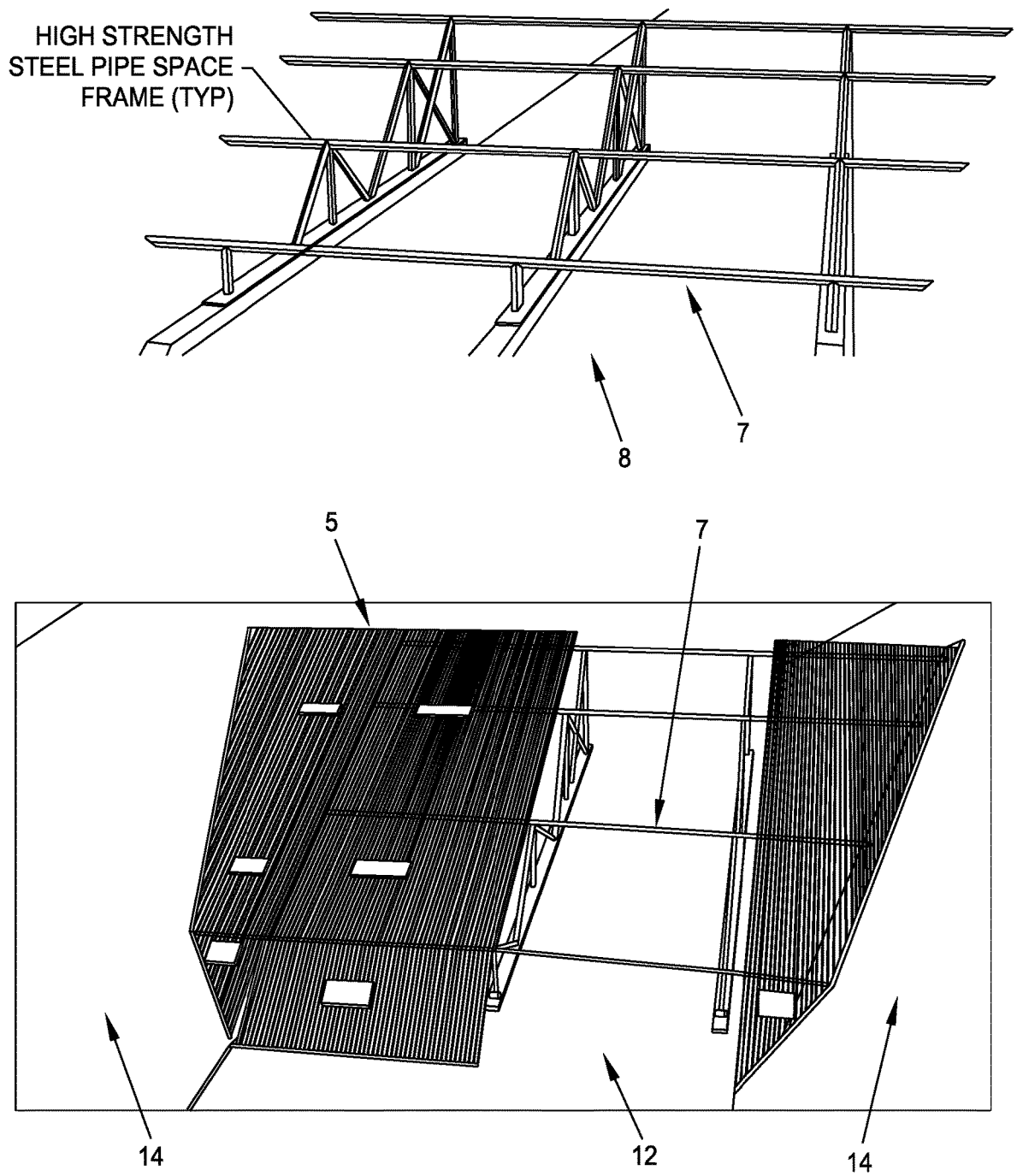
FIG. 1A is a schematic view showing constituent parts of the novel porous surface of the present invention and a support structure for mounting it in a hydraulic channel.

Looking now at FIGS. 1 and 1A, there is shown a novel porous surface 5 formed in accordance with the present invention. Porous surface 5 generally comprises an upstream end 10 and a downstream end 15. Novel porous surface 5 is oriented relative to the flow of fluid in the hydraulic channel such that the "fall line" (i.e., the most direct line from top edge to bottom edge of the surface) is oriented within approximately ±10° in the horizontal plane relative to the direction of the flow of the fluid approaching the porous surface. Porous surface 5 is preferably configured to be mounted to a support structure 8 (FIG. 1A) which is situated in a hydraulic channel, as will hereinafter be discussed in further detail.

Downstream end 15 (i.e., the "trailing edge") of porous surface 5 is positioned such that the trailing edge is above the surface of the fluid or slightly below. When above the surface, it will be apparent that it could be close to the surface to minimize the use of additional materials while providing a dry surface for rescue and self-rescue; or it could extend a sufficient distance above the surface to address access requirements or to accommodate changes in fluid level. Similarly, when the trailing edge is slightly below the surface, the porous surface is submerged, allowing floating debris to pass while arresting the forward movement of larger objects, such as humans and animals.

Laterally, the porous surface, as illustrated, may contain constituent parts that can be described by their geometry and position. The central section 12 can be rectangular, being a simple projection of the horizontal surface below. Side sections, i.e., "wings", 14 will take on a polygonal shape that is dictated by the slope of the channel sides and the slope of the porous surface. These sections are descriptive of form and function, allowing for articulation of sections described herein, however they may only be conceptual without a need to build them as separate components.

Looking next at FIG. 2, in order to provide minimal sliding resistance against upward/downstream forces on objects in the flow of the fluid, porous surface 5 is preferably configured with raised glide structures 20 that are aligned with the general direction of flow (i.e., such that the longitudinal axes of raised glide structures 20 are generally parallel to the direction of flow of the fluid in the hydraulic channel). It will be appreciated that raised glide structures 20 project generally upward from the upper surface (i.e., the face of porous surface 5 through which the flow enters porous surface 5 when porous surface 5 is disposed in the fluid flow) of porous surface 5. Each of raised glide structures 20 therefore has a lower surface that is generally in contact with or below porous surface 5, and an upper glide surface 22 which is not generally in contact with porous surface 5.

It will be appreciated that there are various ways to form porous surface 5, various ways to form and/or attach glide structures 20 to porous surface 5, and various ways to configure glide surfaces 22 which will be apparent to those of skill in the art in view of the present disclosure. By way of example but not limitation, FIG. 2 shows a porous surface 5 comprising a plurality of openings 25 formed therein, with raised glide structures 20 projecting from the top surface of porous surface 5 so as to elevate raised glide surfaces 22 therefrom. By way of further example but not limitation, FIG. 2 also shows a porous surface 5 formed as a "grate", wherein porous surface 5 comprises rectangularly-shaped elongated bars 30 disposed on top of one or more generally perpendicularly-disposed crossties 35, such that bars 30 project upwardly from crossties 35, wherein the bars 30 serve as the raised glide structures and the top surfaces of bars 30 serve as glide surfaces 22.

It will be appreciated that, in order to provide porosity in porous surface 5, gaps 40 (FIG. 2) are disposed between raised glide structures (e.g., between each of the bars 30 in the embodiment of porous surface 5 shown in FIG. 2). The total area of the gaps 40 in the porous surface is preferably maximized, in order to minimize head loss, preferably with 50% or greater porosity (i.e., relative to the total area of porous surface 5).

Additionally, in order to minimize head loss, the more-horizontal-than-vertical pitch of the porous surface disposed in the flow of the fluid is preferably set at an angle of 30 degrees or less above horizontal (<~1.7:1 H:V ratio), which has been demonstrated to be at the knee of the pitch-tohead-loss curve for porous surfaces, below which no appreciable reduction in head loss is obtained and above which head loss rises dramatically.

Further improvement in performance of porous surface 5 for rescue operations may be obtained by setting porous surface 5 at a pitch of 10 degrees above horizontal or less (about 5.7:1 H:V ratio), inasmuch as such a reduced pitch relative to the surface of the fluid in flow results in requiring substantially less force to press the victim upward along porous surface 5. This also substantially reduces the likelihood of objects being pinned against the porous surface below the fluid level (i.e., because of the principle of a machine called an inclined plane wherein it takes less force from the flow of the fluid to lift an object up an inclined plane, such as the glide surfaces of porous surface 5), when the slope of the inclined plane is more gradual, providing a longer distance of travel to do the work of lifting an object up the slope.

In order to reduce the risk of sliding objects (i.e., objects contained in the flow of the fluid in the hydraulic channel that are in contact with the glide surfaces 22 of the present invention) catching on edges of porous surface 5 which are not parallel to the direction of flow (e.g., upstream end 10, cross-members such as the aforementioned crossties 35, edges of perforations such as the aforementioned openings 25, etc.), such edges are preferably depressed below the plane of glide surfaces 22. Depending on the application and the spacing of glide surfaces 22, the depth of depression of other surfaces (e.g. crossties, perforations, etc.) is selected so as to reduce the risk of lateral edges and other projecting geometry that may catch objects and materials pressed against porous surface 5 by the flow of fluid in the hydraulic channel.

A "grate"-type configuration for porous surface 5 (such as shown in FIG. 2) is a quintessential embodiment that is useful for describing the novel method of effecting rescue of a person or animal caught in the flow.

More particularly, in one preferred form of the invention in which porous surface 5 is provided in the form of a grate, upper bars 30 are aligned with the flow of the fluid (i.e., disposed such that the longitudinal axes of bars 30 are disposed parallel to the flow direction of the fluid), and crossties 35 are attached to bars 30 at positions that are below plane of the raised glide surfaces 22 (i.e., the upper surface of bars 30), preferably as far below as the very bottom of the upper bars (although it should be appreciated that crossties 35 may connect bars 30 intermediate to the top and bottom surfaces of bars 30, as will be apparent to those of skill in the art in view of the present disclosure). The overall height of the bars 30 (i.e., the dimension extending perpendicular to plane of the lower surface of the bars 30) determines how far below the glide surfaces 22 the crossties 35 will be disposed (where the crossties 35 are mounted to the bottom surface of the bars 30).

Other configurations for porous surface 5, such as a perforated plate comprising openings 25 to which glide structures are attached (FIG. 2) will be apparent to those of skill in the art in view of the present disclosure, with the height of the glide structures 20 determining the vertical separation between the glide surfaces 22 and the porous surface 5 that is a perforated plate.

Rotationally, and as shown in FIG. 1, in the horizontal plane, the fall line of porous surface 5 is ideally oriented within 10 degrees of being parallel to the direction of flow of the fluid in the hydraulic channel. This range of flow-attack angles has been found empirically to provide minimal disturbance to the flow.

Figure 3:
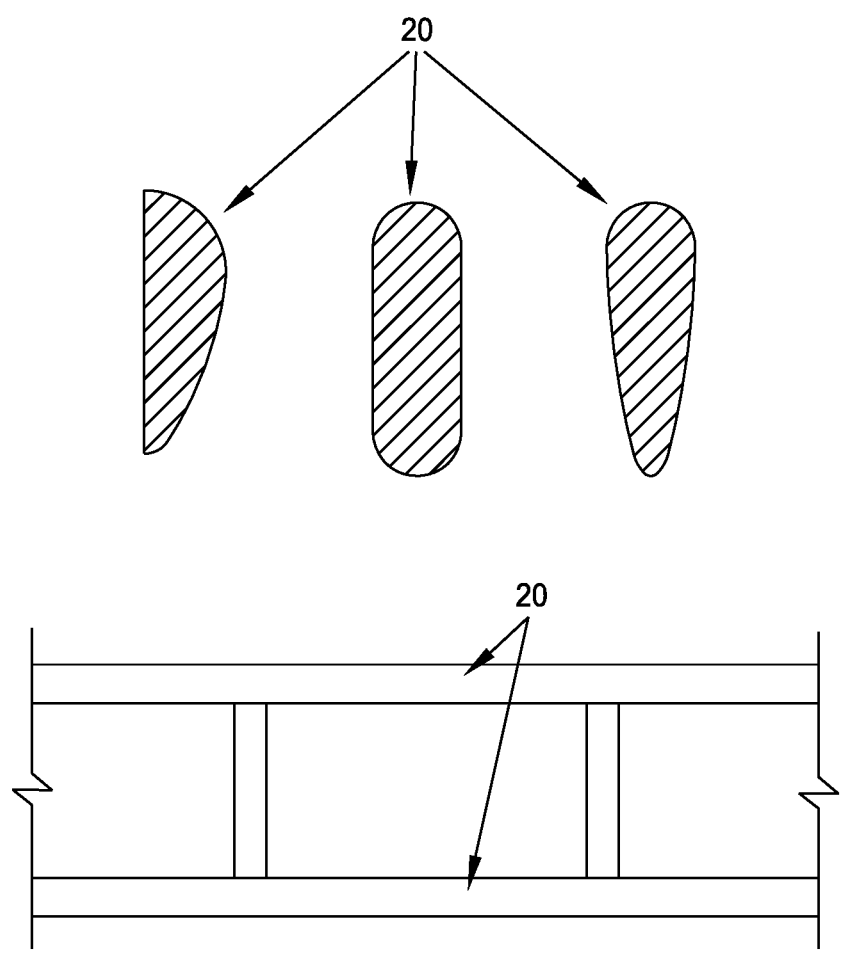
FIG. 3 is a schematic view showing exemplary cross-sections of exemplary streamline shapes used in accordance with the present invention.

To further reduce head loss, and looking now at FIG. 3, glide surfaces 22 are preferably smooth, and their respective glide structures 20 are preferably shaped with streamline curvatures, whereby to eliminate sharp edges.

Still looking at FIG. 3, it will be appreciated that the top (i.e., glide surfaces 22) of glide structures 20 are preferably rounded, but not necessarily symmetrically rounded. See, for example, the leftmost cross-section of a glide structure 20 shown in FIG. 3, wherein the rounding of the glide surface 20 on the glide structure extends eccentrically outboard on only one side of glide surface 20.

Furthermore, where raised glide structure 20 abuts a gap in porous surface 5, the cross-section of glide structure 20 preferably continues in the direction of flow to a trailing streamline edge below the porous surface. See, for example, the rightmost cross-section of a raised glide structure 20 shown in FIG. 3, wherein the raised glide structure cross-section tapers in the direction of flow of the fluid. In these locations, the sides (i.e., the surfaces aligned with the flow of the fluid in the hydraulic channel) of the raised glide structures 20 may be tapered, not only to a leading streamline form, but also a trailing streamline form, the latter being diminishing tapers such as a convex curve or a taper to a narrow edge. Such adjustments to the contours of the structure of materials opposing the flow have been shown empirically to reduce head loss by as much as 89%.

The disposition of porous surface 5 relative to the plane defined by the top surface of the fluid flowing in the hydraulic channel naturally generates an increasing rate of flow higher in the fluid as the inclined porous surface 5 diverts energy upward. This generally results in a "pillow wave" above the natural fluid level, allowing objects to be deposited at, near, or even above, the plane of the fluid as the pillow wave breaks through porous surface 5 and returns back to the natural (i.e., undisturbed) level.

This higher rate of flow near the surface of the fluid applies additional force to objects disposed in the fluid as those objects encounter porous surface 5, whereby to continue the motion of the object up the last portion of the submerged incline. This additional force conveniently compensates, at least partially, for the increased friction from the weight of the object on the raised glide surfaces caused by the decreased buoyancy of objects as they begin to project above the surface of the fluid.

The optimal porous surface 5 has minimal resistance to flow, generates minimal turbulence, minimizes capture of debris that may get hooked on joints and crossmembers, minimizes the risk of objects getting pinned against the surface due to friction being greater than the upward forces against the object. This balances the need to lift non-volitional victims to safety (gradual slope) while limiting cost of materials (steeper slope—less length for a given depth).

In one embodiment of the present invention, there is provided a grate that is similar to standard deck grating (e.g., metal bar grating), but having specific differences. This description relies on the grate as an illustration to describe the characteristics generally applicable to the design and methods, however, it will be appreciated that other porous surfaces 5 comprising configurations different from rectangular bar grating fall within the scope of the present disclosure.

Conventional bar grating is sometimes used to create decks/platforms, treads, etc. for persons to walk on (or for other forms of protection typically at horizontal or near-horizontal orientations, such as ice bridges). Often, on the upper edges of the load bar stock there is a toothed or serrated surface to provide traction under foot. Additionally, such grating typically has square or rectangular gaps formed by setting bars on edge in a parallel configuration and cross-connecting them with crossties in the form of rods or bars. Novel porous surface 5 may be constructed utilizing any of the construction parameters used in conventional bar grating. By way of example but not limitation, the crossties (e.g., crossties 35) can be attached to the bars (e.g., bars 30) in a variety of ways including, but not limited to, welds, threads or swages, or, in the case of molded materials, being formed integral to the mold. Conventional grating often employs crossties that are narrower than the height of the bars and are typically installed flush with the top surface of the grate in order to assist with walking and motility of wheeled devices or skids. Some grate systems recess the crossties so they are not flush with either surface (top or bottom) of the bars. Alternatively, crossties can be surface-welded to the bars, although this configuration is not useful for foot traffic and is less prevalent. Crossties can be bars as high as the main bars, creating an egg-crate-like grid.

The aforementioned features of conventional bar grating (e.g., serrated surfaces, cross members flush with the top surface of the bars) are disadvantageous to performing the function of a rescue surface formed in accordance with the present invention. Instead, when forming porous surface 5 so as to be an effective rescue surface, smooth bar surfaces with no crossmembers at the upper surface are preferred, whereby to enable objects to more readily slide in the direction of flow by eliminating sources of resistance. In this respect, the upper surfaces of the bars are configured to act as glide rails (e.g., as the glide surfaces 22 discussed above).

Common bar spacing in production grate stock is in the about 1 inch (2.5 cm) range for pedestrian and wheelchair traffic and up to about 2 inches (5 cm) for pedestrian traffic. Bar spacing may be larger for applications in which the grate is provided to accommodate large vehicles (i.e., where pedestrians are excluded). Common crosstie spacing is between one and four times the bar spacing. The foregoing dimensions provide structural rigidity, consistent footing, and protection from fall-through of larger, heavier objects when used in platforms.

In order to minimize disturbance to the flow of the fluid in the hydraulic channel, with the present invention, porous surface 5 is preferably configured with spacings larger than conventional tread grating. This is because, with porous surface 5 of the present invention being used to effect a rescue, footing is less important than with standard walking surfaces. Victims will generally be recumbent as the flow delivers them up porous surface 5 (i.e., up along raised glide surfaces 20).

However, it should be appreciated that it may be desirable to facilitate safer walking on porous surface 5 near (and above) the fluid level in order to facilitate final escape and/or rescue efforts. This can be achieved by adopting a readily walkable design for the entire surface, or by modifying the configuration of porous surface 5 near the surface of the fluid where walking is most likely to take place. Openings less than about 4 inches (i.e., about 10 cm) in breadth will avoid entrapping large body parts (this is the typical maximum spacing under building codes for such things as railing balusters). An intermediate transverse gap width of about half of that dimension (e.g., 2 inches/5 cm) provides a span that is less than the width of most human feet, allowing weight to be distributed across at least two bars per ped, per knee or per hand thus providing some planar stability to the limb supporting a person's weight. Large wildlife (e.g., hoofed animals such as elk) will typically benefit from this dimensioning in the same fashion. Smaller-footed animals (and smaller humans, e.g., children) may need to crawl/grapple their way to safety once the flow has delivered them recumbent to the waterline.

Transverse material (e.g., crossties) in/mounted to porous surface 5 provides a structural connection between the glide structures aligned with the direction of flow. These transverse materials are embodied as crossmembers in conventional bar grating. The transverse material need only be spaced so as to provide the desired rigidity to the flow-aligned materials, relinquishing their role as traction surfaces (thereby distinguishing the construction of grate-like porous surfaces 5 from the construction of conventional under-foot grating). If desired, in some embodiments of the present invention, while these transverse materials can remain depressed below the glide surfaces below the fluid level, an exception can be made near and above the fluid surface where crossmembers could be disposed flush with the top surface to improve the walkability of the working portion of the surface to improve stability for escape and rescue.

Attached to the bars 30 at other than the top glide surface 20, preferably flush with the bottom surface of the bar 30, crosstie 35 spacing can be at least a 2:1 ratio (crosstie spacing:glide structure spacing) of the opening, such as with conventional bar grating, but structural analysis, depending on materials and their dimensions, may find greater crosstie spacing to be adequate for the rescue purposes of the present invention.

Thin crossmembers (e.g., crosstie 35) will typically be spaced more closely together than thicker ones (i.e., because thin crossmembers provide less structural integrity than thick crossmembers). Crossmembers do not necessarily need to be as rigid as the load bars/glide structures because their main role is to stich the load bearing elements into a matrix. Separate structural cross members can be disposed beneath the porous surface to support the load directly from the load bearing elements of the porous surface such as the raised glide structures. See, for example, FIG. 1A, which shows a support structure 8 comprising a plurality of structural crossmembers 7 that directly support the porous surface 5. Structural crossmembers 7 can be spaced more broadly than the transverse components (such as crossties) that are part of porous surface 5, particularly when the glide structures 20 support loads placed on the glide surfaces 22 and transfer those loads directly to the structural crossmembers 7.

The narrowest dimension (i.e., "width" or "thickness") of the glide rails (e.g. bars 30) is preferably disposed generally normal to the direction of flow so as to minimize the cross-sectional area of glide structures 20 facing the flow of fluid. The longest dimension (i.e., length) of the glide structures 20 is preferably disposed generally parallel to the direction of flow, with a pitch that is more horizontal than vertical as discussed above.

The foregoing two orientations provide the benefits discussed above (e.g., smooth sliding glide surfaces 22 oriented in the direction of flow, minimal cross-sectional area to impede the flow of fluid, etc.). The glide structure's 20 height, i.e., the dimension that is orthogonal to its length (i.e., longitudinal dimension) and to its thickness (i.e., its dimension laterally in the horizontal plane normal transverse to the direction of flow) is disposed generally vertically. The cross-sectional shape of the glide structures 20 can be rounded in one of a multitude of streamline shapes in order to eliminate square edges and improve laminar flow around the raised glide surfaces 22. The spacing of the glide surfaces 22 are preferably maximized in order to further reduce flow resistance of porous surface 5, optimized against the needs for narrowing the spacing for rigidity, prevention of entrapment, and the minimum necessary degree of ambulation. To aid in construction, installation, implementation or adapting to flow dynamics, etc., it is anticipated that variation from the preferred constructions stated above may be applied in some embodiments without departing from the scope of the present disclosure.

Although the transverse components 34 connecting glide structures 20 (e.g., bars 30) have been depicted in FIG. 2 as rods 35, it should be appreciated that transverse components 34 may comprise crossties 35 in other forms (e.g. bars, hydrofoils, etc.) or other cross-connecting materials, such as perforated surfaces, other geometries, or combinations thereof. A function of transverse components is to stitch together glide structures into a matrix of glide structures and porous voids to comprise the porous surface with raised glide surfaces.

In one preferred form of the present invention, where porous surface 5 assumes a grate-style configuration, the use of crossties 35 in the form of rods provides an optimal implementation, particularly where steel is used to form the components of porous surface 5 (e.g., because steel is inexpensive, sturdy and readily available, and the round cross-section of the crosstie rods 35 reduces drag). Transverse components 34 (e.g., crossties 35) are preferably disposed below the plane of the glide surfaces 22, in order to reduce the likelihood of catching or resisting objects sliding along the glide surfaces 22.

Figure 4:
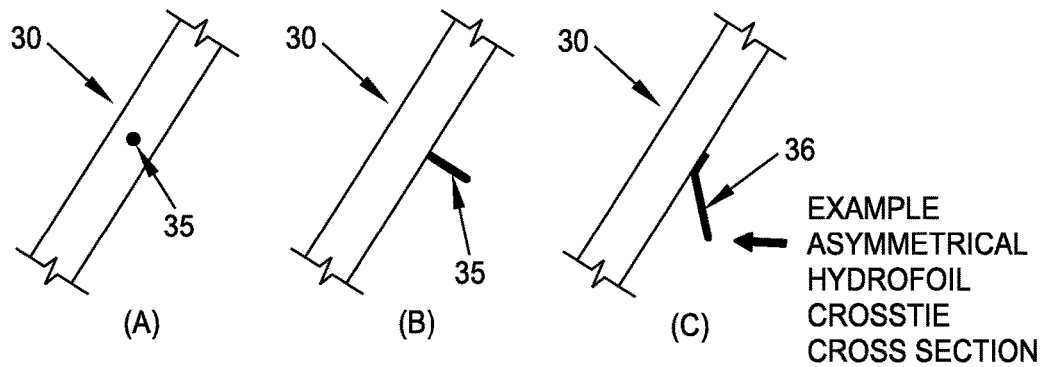
FIG. 4 is a schematic view illustrating crosstie cross-sections, including one that is a hydrofoil (C)

Looking now at FIG. 4, it will be appreciated that, if desired, transverse components such as crossties 35 may be asymmetrical in profile facing the direction of flow of fluid in the hydraulic channel (i.e., a hydrofoil shape 36). Such asymmetry can create flow dynamics where the fluid velocity above and below the crossmember is different, whereby to encourage stringy materials (e.g., weeds and grass suspended in the fluid) to pass faster on one side of the crosstie 35, thereby reducing the likelihood of the material wrapping around the crosstie and being captured.

Figure 5:
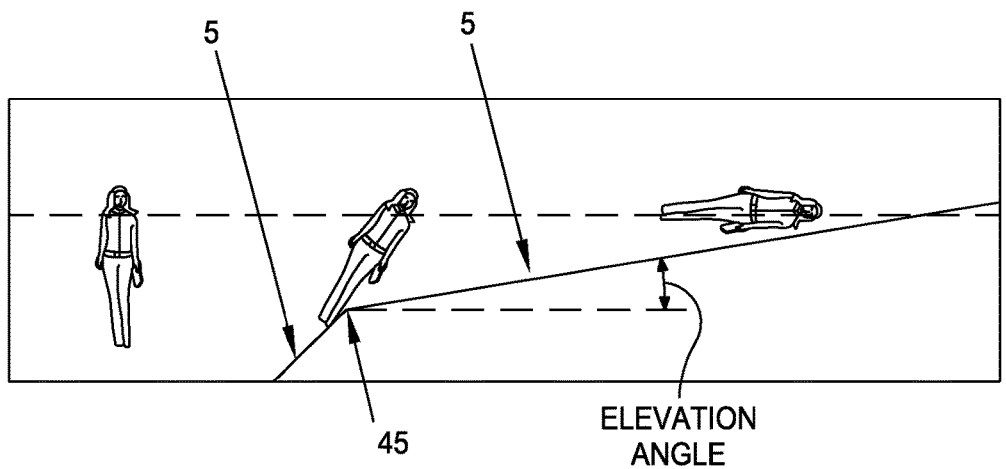
FIG. 5 is a schematic view illustrating the fluid depths encountered with the two slopes, the break point between the two sloped surfaces, a plurality of potential fluid levels relative to the porous surface and a body immersed in the fluid.

Looking now at FIG. 5, a fundamental aspect of the present invention is that planar porous surface 5 is positioned so as to extend into the fluid to a depth that is sufficient to capture the humans and/or animals suspended in the fluid in order to effect rescue as well as above the fluid to an extent so as to provide an ambulation area for access and egress. Where porous surface 5 is fixed at a selected pitch along the entirety of its length, porous surface 5 may be required to be particularly long to reach the depth required by the application. By way of example but not limitation, where porous surface 5 is pitched at a 6:1 H:V ratio, a 6-foot depth requires a greater than 36-ft long porous surface 5. To economize on the cost and space required for such a length, porous surface 5 preferably comprises one or more break points 45 at which the upstream pitch is configured to be steeper than the downstream pitch that follows.

Figure 6:
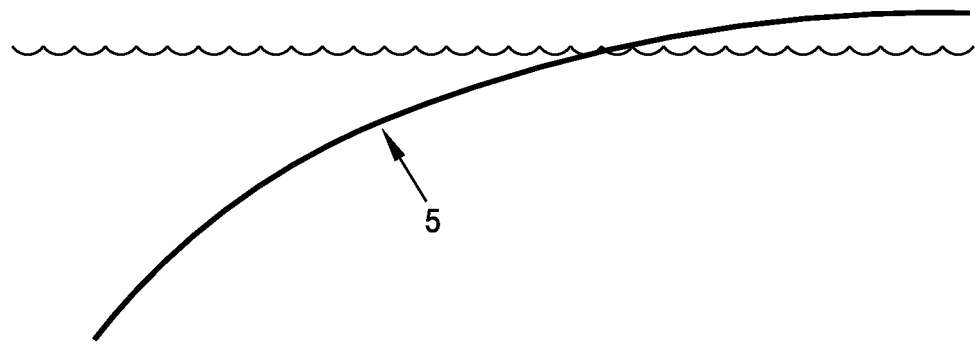
FIG. 6 is a schematic view showing detail of a variable pitch (e.g., longitudinally curved) porous surface formed in accordance with the present invention.

Additionally and/or alternatively, and looking now at FIG. 6, porous surface 5 may be formed longitudinally as a curve (i.e., omitting one or more discrete break points 45 between planar surfaces having different pitches).

A fully submerged person or animal has more buoyant force than a partially submerged one and therefore has the least friction on the gliding surfaces, when the person or animal is fully submerged in the fluid. Thus, a steeper pitch located at depth (e.g., such as shown schematically in FIG. 5) may still successfully elevate the person or animal at depth, while shortening the overall length of the porous surface. A variable pitch forming a curvature to the plane of the surface (e.g., such as shown schematically in FIG. 6) could also be implemented in order to avoid having one or more sharp transitions at break points, and to minimize the overall length of porous surface 5.

Figure 7:
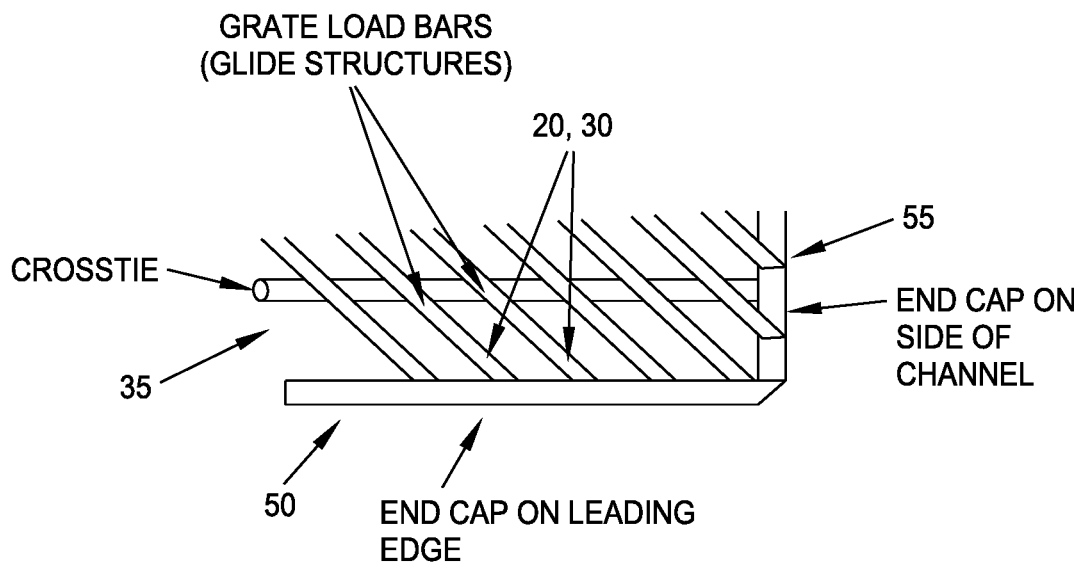
FIG. 7 is a schematic view showing a trapezoidal-form porous surface comprising end caps on raised glide structures formed in accordance with the present invention.
Figure 8:
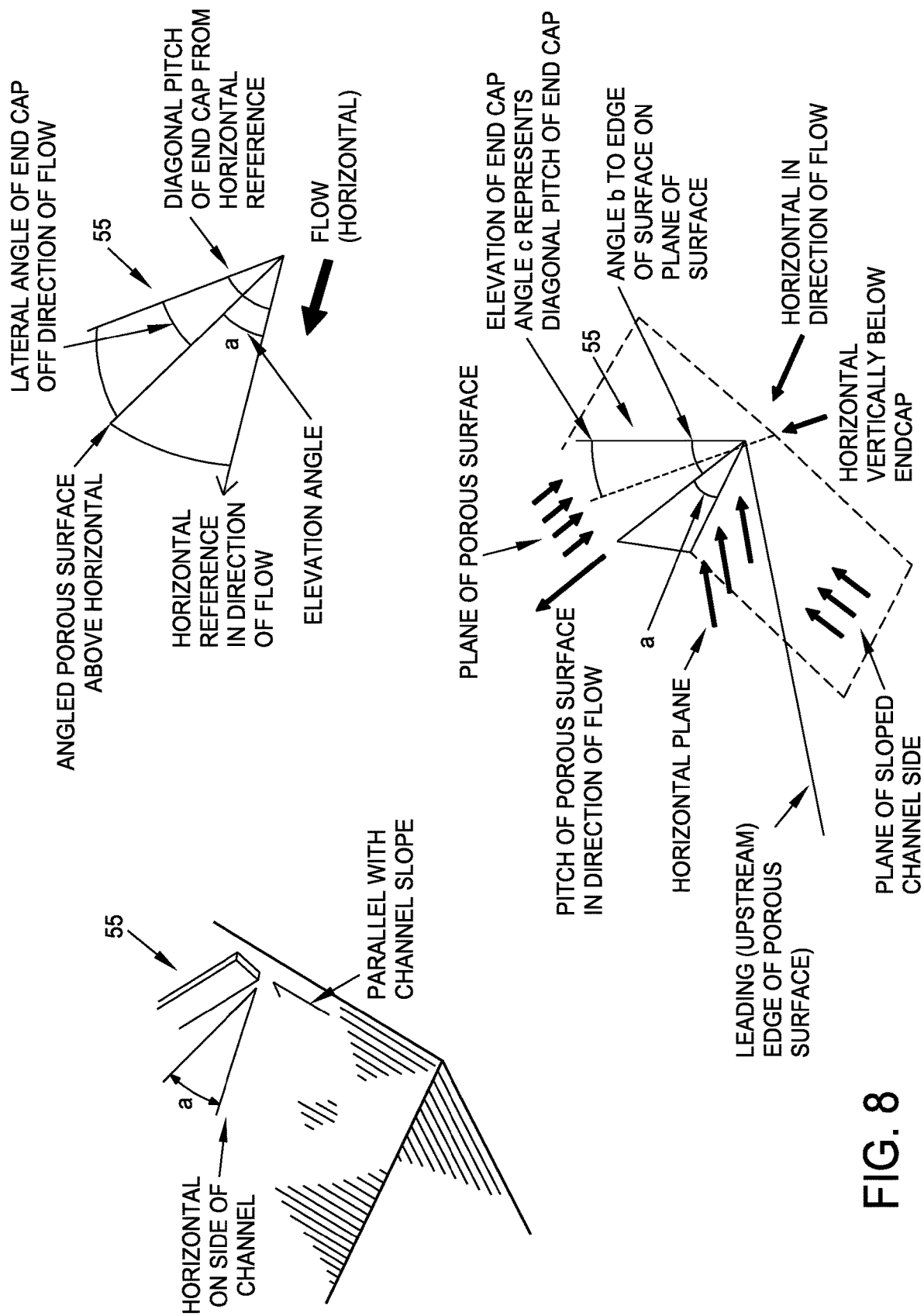
FIG. 8 is a schematic conceptual diagram showing certain angles relevant to the present invention.

It will also be appreciated that, inasmuch as many open hydraulic channels (e.g., irrigation canals) comprise side walls that are uniformly sloped, planar surfaces, the cross-section of the hydraulic channel approximates a trapezoid, wider on the top than the bottom. In order to fully cover the width of the channel, porous surface 5 may be shaped in a trapezoidal manner so as to align the sides (i.e., the legs of the trapezoid) of porous surface 5 with the taper of the walls of the channel. (It can be appreciated that other hydraulic channel surface geometries may result in a polygonal shape of the porous surface 5 other than a trapezoidal shape.) FIG. 7 shows one corner of the leading (i.e., upstream) edge of an exemplary trapezoidal form of porous surface 5 with end caps 50 on the upstream ends of glide structures 20. The end caps 55 on the side edges of the porous surface (e.g., on the legs of a trapezoidally shaped porous surface 5) preferably engage the side walls of the channel as depicted in FIG. 7 and FIG. 8, and as such provide a broad mating surface between the side edges of the porous surface and the hydraulic channel sloped sides to better protect the hydraulic channel surface from wear. When the end caps terminate ends of glide structures on the side edges of the porous surface that are exposed to the oncoming flow of the fluid in the hydraulic channel, the end caps 55 reduce the potential for objects to catch on the ends of the glide structures.

Looking now at FIG. 8, where the ends of the glide structures meet the sidewall of a sloped channel, it may be desirable to orient end cap 55 at a complex angle that matches (i) the pitch of porous surface 5 relative to the direction of flow, and (ii) the slope of the sidewall of the channel normal to the flow. More particularly, and still looking at FIG. 8, Angle a is the elevation angle of porous surface 5 as determined by its pitch parallel with the direction of the flow. Angle b plus 90 degrees is the angle, in the plane of the porous surface, of the side of the trapezoidal porous surface 5 with respect to its leading edge. Angle c is the angle of the elevation of the end cap above horizontal.

Thus it will be appreciated that to provide a parallel contact surface between the end cap (or the ends of certain glide structures where there is no end cap) and the sloped side surface of the hydraulic channel (e.g., canal), end cap 55 and the ends of the glide structures coincident with the exemplary trapezoidal leg side of the porous surface 5 may be oriented at a complex angle with respect to the glide structures and to the plane of the side of the channel, resulting from the interaction of the above angles a-b-c.

Raised glide structures 20 on porous surface 5 may terminate as exposed ends on the leading (i.e., upstream) edge of the porous surface. Inasmuch as upstream ends could catch objects and materials, exposed ends of glide structures 20 (e.g., the exposed ends of bars 30 which define glide surfaces 20) can be rounded or capped with an end piece 50 that joins one end to the next with a transverse element (e.g., a common bar or half-round bar disposed generally horizontally and generally perpendicular to the direction of the flow) that connects the ends of the glide structures 20 (e.g., bars 30), forming the upstream end cap.

Figure 9:
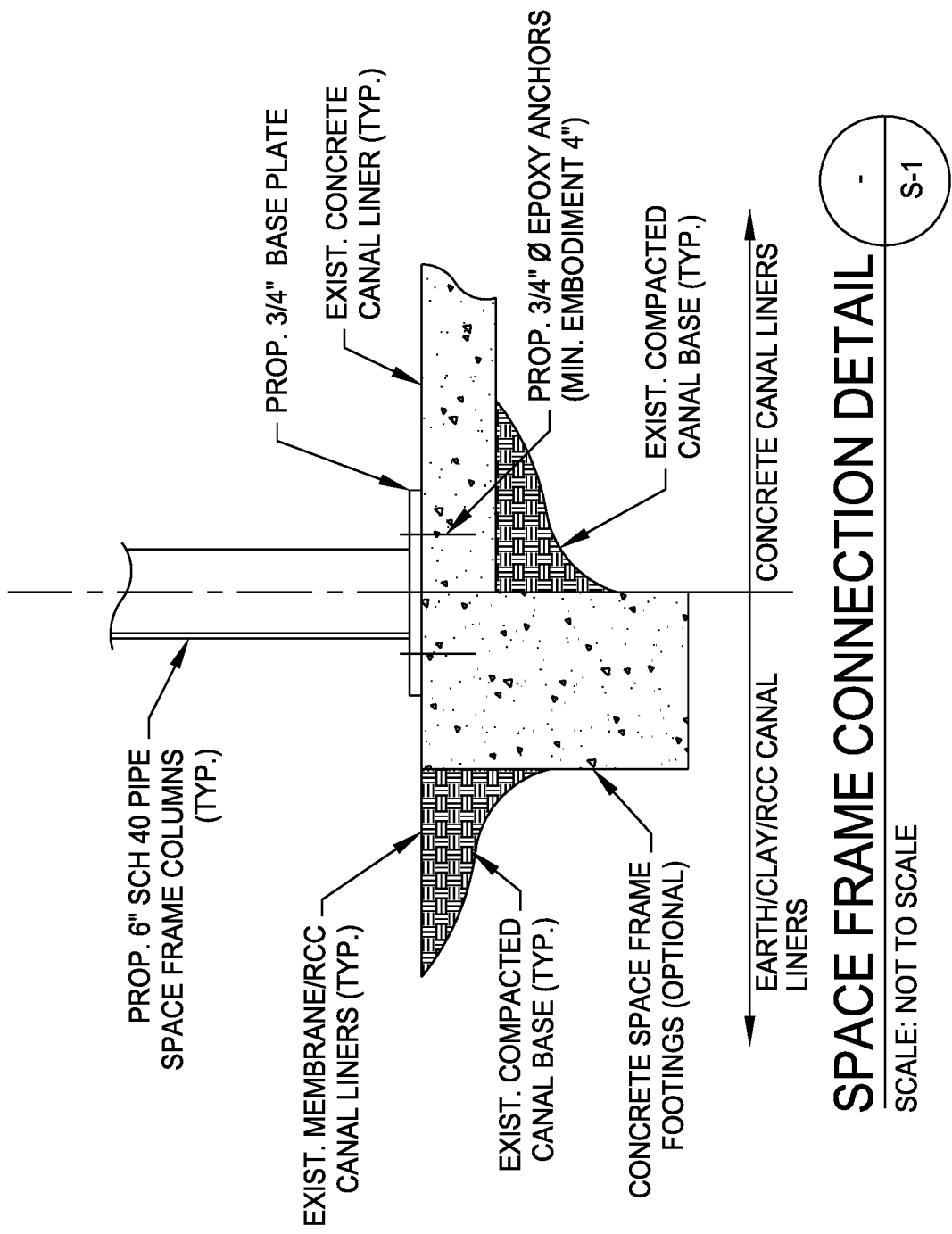
FIG. 9 is a schematic view showing details of how the novel rescue apparatus of the present invention may be fastened to (thick), and through (thin), substrate.

Anchoring the novel apparatus of the present invention against the force of the flow of the fluid in the hydraulic channel requires a substantial means of attachment between support structure 8 (to which porous surface 5 is mounted)

and the surrounding environment (e.g., surfaces of a hydraulic channel). More particularly, and looking now at FIG. 9, in situations where the surface of the channel can be penetrated (e.g., in order to drive an anchor through the surface of the channel), the rescue apparatus of the present invention (e.g., support structure 8) can be pinned into the substrate or a foundation in the channel, regardless of the material encountered (e.g., earth materials or concrete). However, it can be challenging to connect support structure 8 to the substrate without damaging the substrate itself or causing undesirable leaks in the channel.

Attachment of support structure 8 of the novel rescue apparatus of the present invention directly to the channel surfaces employs generally recognized fasteners including but not limited to: screws, stakes, pins, embedded captive surfaces, etc.

Over time, stress on such fasteners may lead to undesirable damage or leaks to/through the channel surface. Some channels comprise only a thin layer of material in order to provide a smooth surface with little structural integrity. Common surface materials for hydraulic channels include but are not limited to a skim coat of grout or a geomembrane material that must be penetrated to get a purchase on the underlying material, which is typically compacted earth.

To avoid penetrating the channel surface, either friction (e.g., heavy bases or feet) or a means of attaching to the bank outside of the channel are necessary. See, for example, FIG. 10, which shows a streamline foot 60 disposed in an (optional) depression formed in the channel surface for receiving foot 60 which may be used to anchor support structure 8 of the novel rescue apparatus of the present invention (,) in a hydraulic channel.

Figure 10:
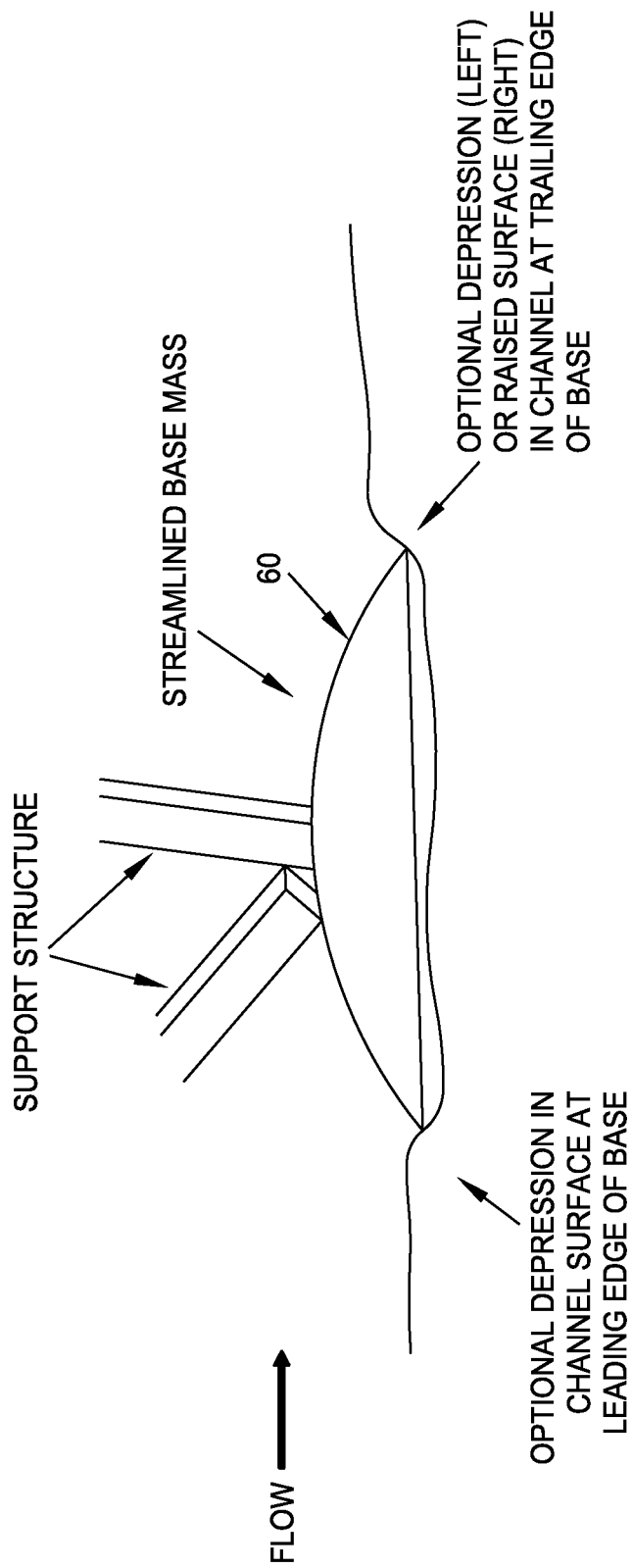
FIG. 10 is a schematic view of an exemplary heavy (e.g., a concrete mass) base (e.g., to anchor the present invention within a hydraulic channel), which optionally may be seated in a depression formed in the channel surface, which depression may reduce the hydraulic profile of the base to the flow and/or provide resistance to downstream forces against the base.

However, it will be appreciated that, unless the channel has readily available ridges, convex or concave surfaces, serrated or other textured surfaces and the like for increasing friction between the surfaces of the channel and the novel rescue apparatus (or for receiving an anchoring foot 60 such as shown in FIG. 10), it is often impractical to place enough mass on the bottom of the channel to maintain sufficient friction against the force of the flow. The mass consumes volume in the channel, impeding flow of the fluid in the channel. The large base shapes can also promote turbulence, increased velocities and eddies that can cause wear around the points of contact between base and channel surface.

To minimize risk of damaging the channel surface with penetrating attachments or massive base structures, the novel rescue apparatus of the present invention may be attached to the bank (i.e., at points entirely outside of the channel itself). To this end, and looking now at FIG. 11, one way to attach the novel rescue apparatus of the present invention to a bank of a hydraulic channel is to construct a spanning structure 65 across the channel and suspend the novel rescue apparatus from the spanning structure. To this end, spanning structure may comprise beams, trusses, arches or other suspension structures which will be apparent to those of skill in the art in view of the present disclosure. It will be appreciated that spanning structure 65 may be used in lieu of, or in addition to, such other fixtures as discussed above (e.g., feet 60 supporting the apparatus from the bottom and/or sloped side surfaces of the channel, etc.).

Figure 11:
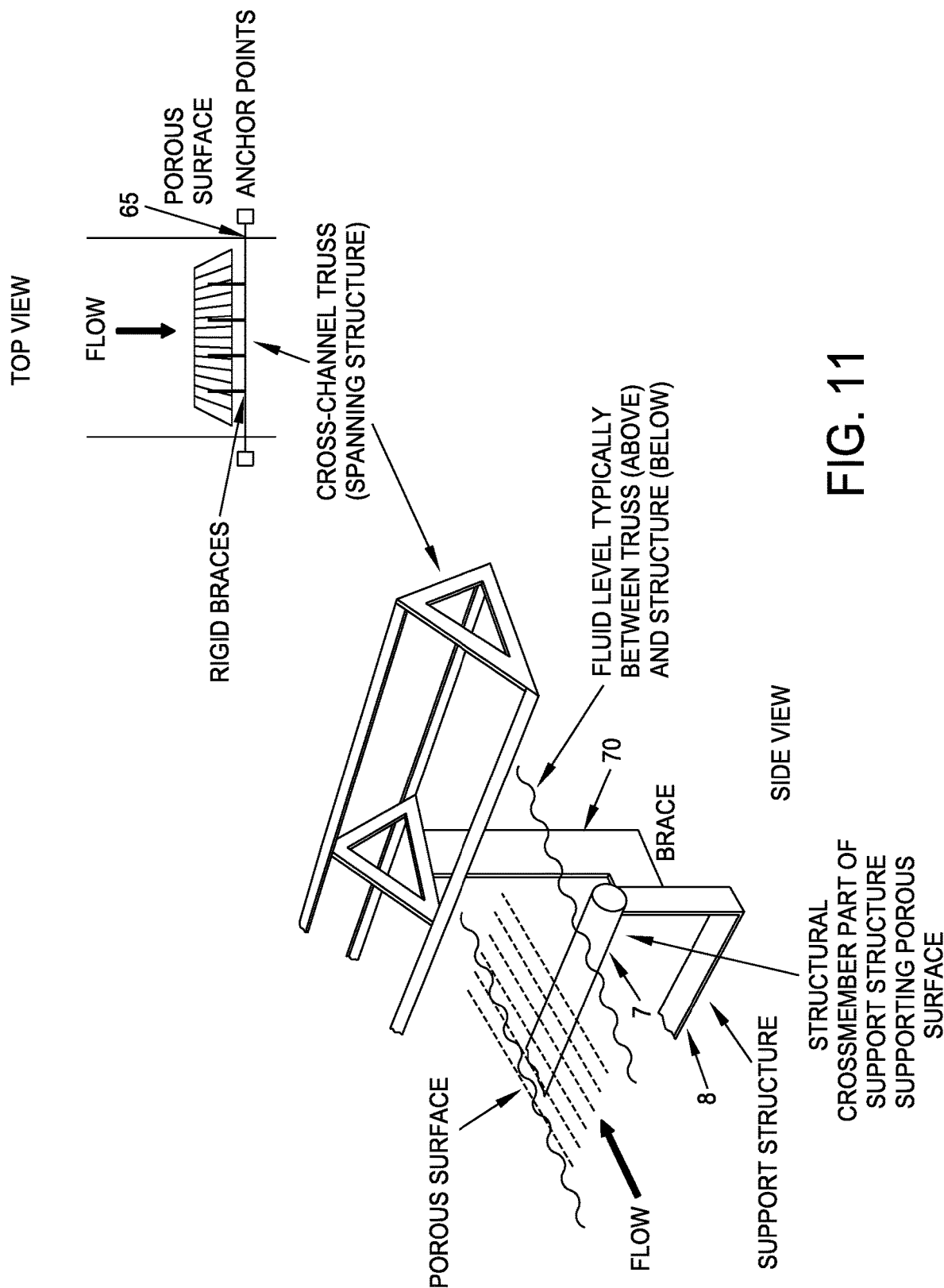
FIG. 11 is a schematic view showing a truss disposed across a hydraulic channel, with braces connecting to the structural support frame located under the porous surface formed in accordance with the present invention, with or without the frame having contact with the bottom of the hydraulic channel (e.g., either suspended from the truss or weight-bearing to the bottom of the hydraulic channel)

In order to avoid obstructing the planar surface used to guide victims and objects to the surface, the spanning structure 65 of the novel rescue apparatus (i.e., porous surface 5) of the present invention is preferably connected to the apparatus downstream from the submerged portion of the porous surface 5. To this end, and looking at FIG. 11, a plurality of braces 70 may be provided, with braces 70 extending down from spanning structure 65 to the support structure 8. Braces 70 are preferably disposed at intervals along the width of the novel rescue apparatus (i.e., porous surface 5) across the dimension of the hydraulic channel. Braces 70 can be attached to, or pass through, the exposed portion of porous surface 5 disposed above the surface of the fluid in the hydraulic channel, or braces 70 can extend into the fluid downstream of the surface and connect to support structure 8 supporting porous surface 5 as depicted in FIG. 11.

As discussed above, support structure 8 for supporting and mounting porous surface 5 can be positioned on the bottom of the channel (e.g., supported by one or more feet 60), resting on the hydraulic channel surface, or support structure 8 for porous surface 5 may be suspended from a superstructure (e.g., spanning structure 65) and connected via braces 70 to the superstructure. With the weight of porous surface 5 bearing on the bottom of the channel, the channel span and braces need only resist movement in the direction of flow of fluid in the hydraulic channel. If the entire porous surface is suspended from the spanning structure, the span must support the weight and resist movement in the direction of flow, requiring a more substantial spanning structure and braces.

To minimize disturbance of the flow and maintain stiffness in the direction of the flow, the braces can be thin in one dimension exposed to the flow (i.e., the dimension horizontally normal to the direction of the flow), and wide in the dimension vertically normal to the direction of flow (i.e., the dimension parallel to the direction of the flow). Streamlining the cross-sections of the braces 70 (e.g., by providing braces 70 with rounded edges consistent with example rounded shapes in FIG. 3) can further reduce the flow resistance.

Another method of anchoring the novel rescue apparatus of the present invention is to belay the apparatus from the upstream bank of the channel.

Figure 12:
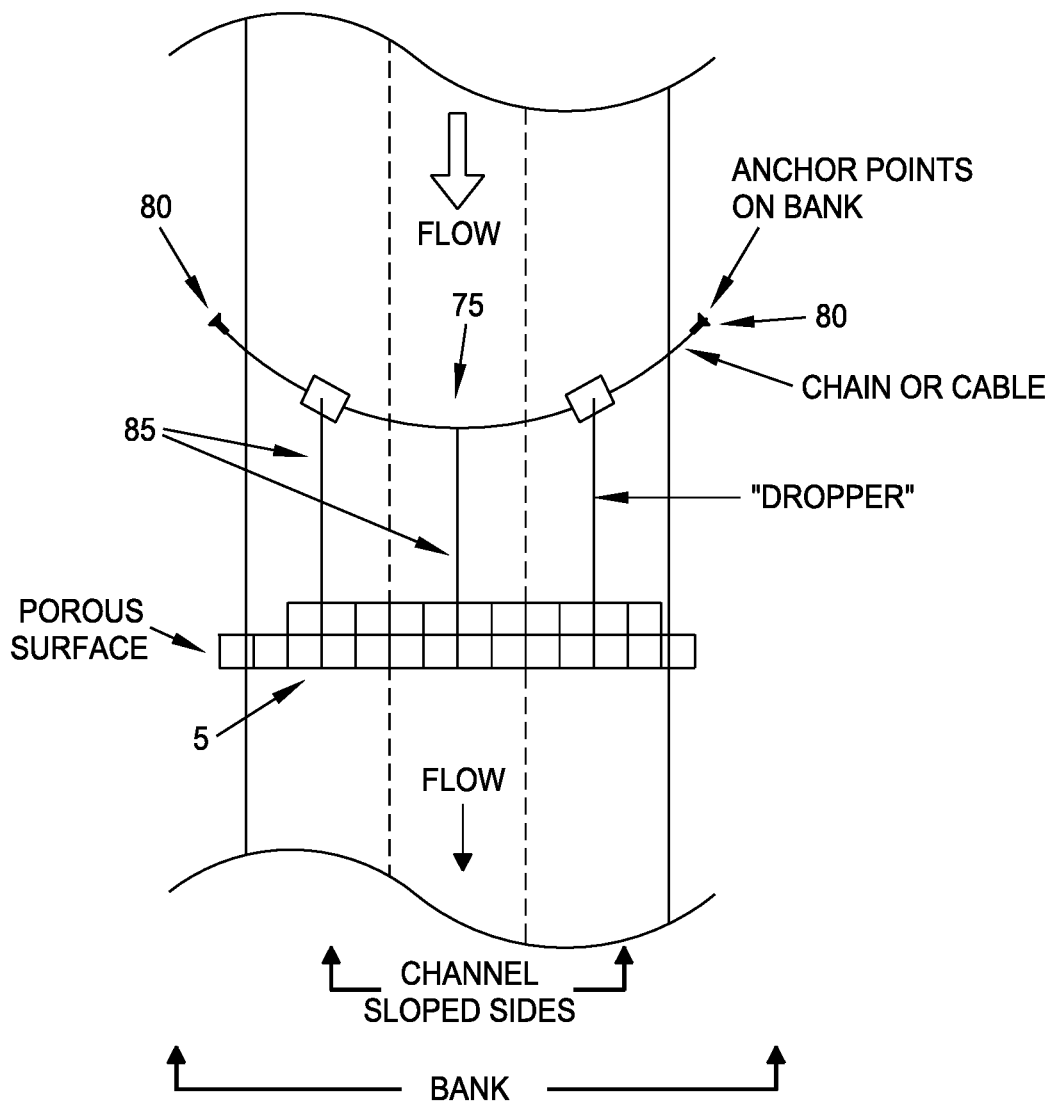
FIG. 12 is a schematic view illustrating catenary chain installation and direct chain attachments for mounting the novel apparatus of the present invention within a hydraulic channel, with both the catenary chain installation and the direct chain attachments resting on the bottom surface of the hydraulic channel and being pinned to upstream anchors on the bank of the hydraulic channel.

Looking at FIG. 12, chain or cable 75 can be anchored at anchor points 80 on opposite banks of the channel, and "looped" across the bottom of the channel, thereby forming a catenary shape downstream from the anchoring points 80 following the planes of the channel bottom surfaces. The loading on the chain is achieved by attaching the chain at multiple points to the leading (upstream) edge of porous surface 5, or to the front (upstream) structural support 8 member at upstream end 10 of porous surface 5. One approach to attach porous surface 5 (or support structure 8 to which porous surface 5 is mounted) to a submerged chain or cable 75 is to employ catenary "dropper" elements 85 to connect the curve of the chain 75 to the edge of porous surface 5 (e.g., upstream end 10) or its support structure 8. Droppers are a well-known method of connecting a support with a catenary shape to a load that presents a linear shape to the catenary.

Alternatively, chains can be extended from the bank directly to attachment points on the lower leading (upstream) edge of porous surface 5 or to its support structure 8. Other connecting materials can be substituted for the chains and will be apparent to those of skill in the art in view of the present disclosure.

In a combination of the belay and overhead-superstructure methods, one or more tethers can be suspended above the channel upstream of porous surface 5 and used to connect to framework attachment points extending above the fluid level. Braces (e.g., braces 70 discussed above) may provide the extensions above the fluid level to elevate the tethers to a height that reduces interference with access to the apparatus.

Figure 13:
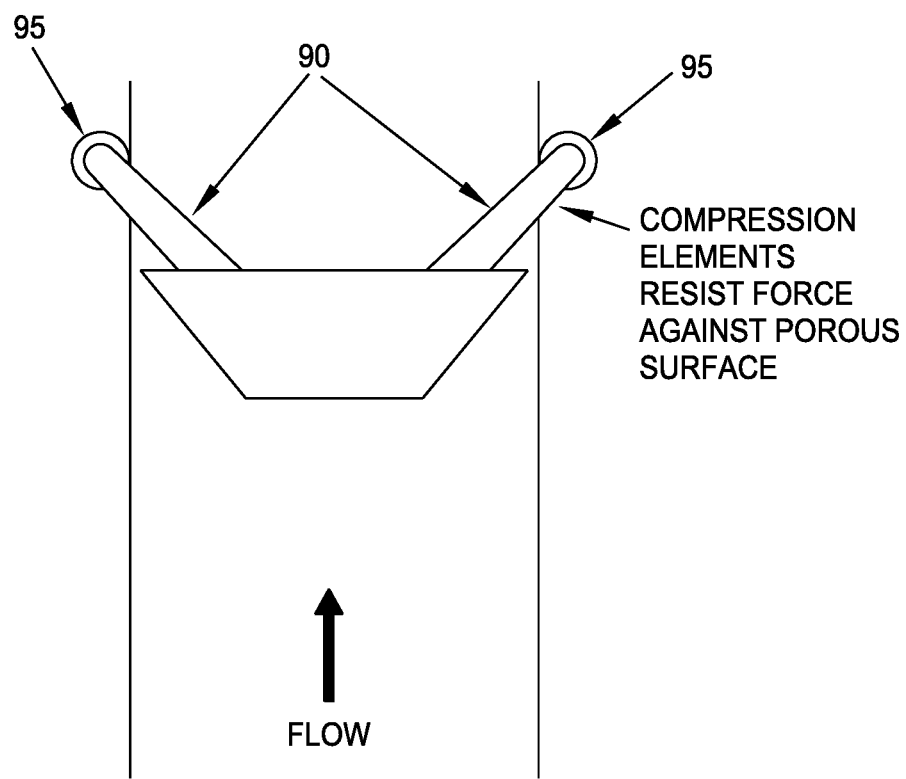
FIG. 13 is a schematic view illustrating downstream anchor points fixed on the banks of a hydraulic channel, wherein the downstream anchor points are connected to the novel apparatus of the present invention using rigid compression elements extending upstream.

As belay elements operate in tension, strut elements operate in compression. Looking now at FIG. 13, a strut anchoring method positions rigid elements 90 at anchor points 95 on the bank downstream of the novel rescue apparatus of the present invention (i.e., porous surface 5). Elements 90 are directed to structural attachment points on porous surface 5 (e.g., downstream end 15 of porous surface 5), or to brace-like elements connecting to the support structure 8 located beneath, and supporting, porous surface 5 as described above. The force of the flow drives the apparatus against rigid elements 90 (and hence, against anchor points 95).

The methods and apparatus discussed above, which are used to position and anchor porous surface 5, are useful in the context of a hydraulic channel comprising a fluid at a fixed depth in the hydraulic channel where porous surface 5 is located. However, it should be appreciated that, if it is desired to anchor porous surface 5 in a hydraulic channel comprising a fluid having variable depths in the channel, the upstream end 10 of porous surface 5 must be fixed at sufficient depth in the channel to function at the lowest anticipated fluid level. The higher, downstream end 15 of porous surface 5 must be extended high enough in the hydraulic channel to be effective at, and rise above, the highest fluid level anticipated for the channel. With an established (i.e., fixed) pitch for disposing porous surface 5 relative to the plane of the top surface of the fluid, the more the fluid level can vary, the longer the porous surface must be.

Looking now at FIG. 14, one way to maintain a fixed depth for upstream end 10 of porous surface 5 relative to the top surface of the fluid flow (regardless of the fluid level within the channel at any given point in time), is to mount porous surface 5 on one or more floats 100 with such intervening support structure elements (e.g., crossmembers 7) as are necessary to support porous surface 5 on floats 100. As the fluid level in the channel changes (i.e., rises or falls), floats 100 (and hence, porous surface 5 mounted thereto) follow the change in fluid level, maintaining the required depth at the leading edge and the required exposed surface above the top surface of the fluid. In this embodiment of the present invention, the addition of the weight of the person or animal disposed on top of porous surface 5 will change the depth of the floating porous surface 5 within the fluid. Therefore, sufficient margin of buoyancy must be included in the design to maintain adequate exposure of the porous surface above the level of the fluid to aid rescue. Since flotation will typically impede fluid flow within the hydraulic channel, the use of floats 100 to mount porous surface 5 is generally only preferable in situations where the resulting impedance to the flow is acceptable.

A further advantage of the present invention, and as discussed above, is that by disposing porous surface 5 at a relatively shallow angle relative to the plane of the fluid in the channel, accelerating upward forces in the fluid column can be disposed at locations along porous surface 5 to "bump up" objects that are being driven up the porous surface. As discussed above, the resistance to the flow is relatively constant over the length of a single pitch of porous surface 5. The result is a steadily increasing rate of flow as the object approaches the fluid surface at the downstream (trailing) end 15 of porous surface 5. To provide one or more accelerating "bumps" at depth, the ratio of porosity can be varied at different depths along the length of porous surface 5 in the direction of the fluid flow (i.e., along the length of porous surface 5 extending between upstream end 10 and downstream end 15).

Figure 15:
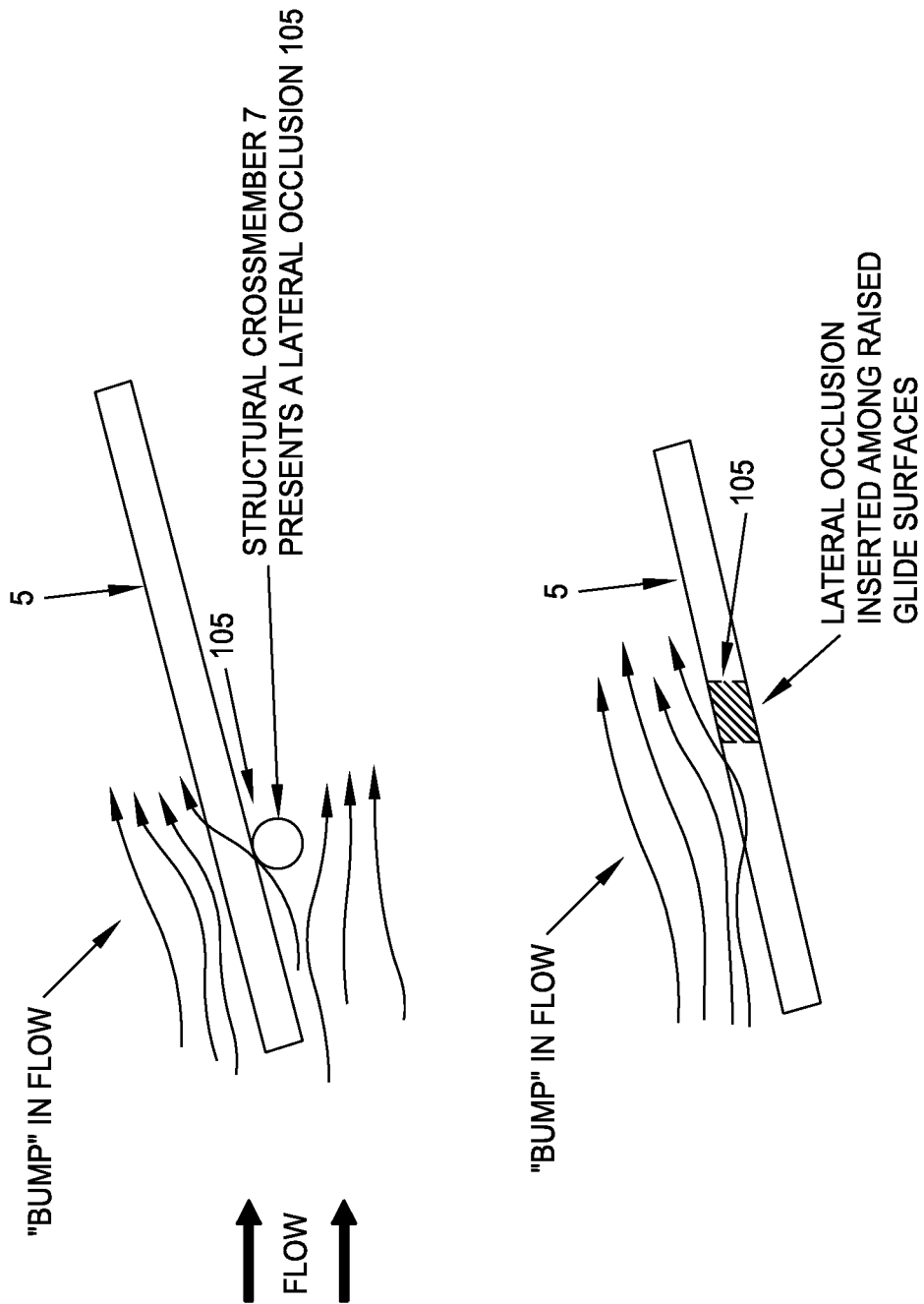
FIG. 15 is a schematic view illustrating how lateral occlusion can affect flow of a fluid encountering a lateral occlusion.

In one embodiment of the present invention, and looking now at FIG. 15, an otherwise homogenous porous surface 5 may comprise one or more transverse occlusions 105 of limited width (i.e., of limited longitudinal dimension the direction of fluid flow in the hydraulic channel). Transverse occlusions 105 may be transversely disposed in the form of structural crossmembers 7, or transverse occlusions 105 may be lateral occlusions disposed across or between glide structures 20.

With this form of the invention, as the fluid flowing in the channel encounters lateral occlusion 105, the result is a hydraulic "jump" in the flow that can provide a bumping action, whereby to accelerate objects (e.g., a person to be rescued who is disposed in the fluid) above glide surfaces 22 of porous surface 5) upward to layers of the fluid column that have higher flow rates. In configurations of the present invention in which porous surface 5 is supported by structural crossmembers 7 of support structure 8 (e.g., such as in the grate-style configuration shown in FIG. 2 where the grate is subsequently mounted on structural crossmembers 7 integral to support structure 8), the structural crossmembers 8 can be positioned longitudinally in the direction of flow so as to provide hydraulic lift at desired positions beneath porous surface 5 at depths in the fluid most conducive to the use of hydraulic jumps. In addition to positioning the hydraulic jump effects of structural crossmembers 7, additional hydraulic jumps can be imposed by the selective placement of transverse occlusions as described above on or between glide structures.

Looking now at FIG. 16, in order to reduce the width of porous surface 5 such that porous surface 5 does not need to span the full width of the hydraulic channel, if desired, a narrow porous surface can be positioned in the channel. To facilitate movement of humans or animals caught in the flow of the fluid toward the porous surface 5, one or more diverters 110 may be utilized upstream of the porous surface. It will be appreciated that substantially less material is required to construct porous surface 5 if porous surface 5 is made narrower than the full width of the hydraulic channel. If installed without further diverter apparatus 110, victims must divert themselves toward the safety of porous surface 5 (e.g., by swimming to the portion of the channel where the flow of the fluid in the hydraulic channel will deposit them on the porous surface 5). Passive diverters 110 can be installed upstream of the porous surface, i.e., to laterally direct victims toward the porous surface, as will hereinafter be discussed in further detail.

Diverters 110 can be implemented in a multitude of fashions. By way of example but not limitation, diverters 110 may comprise vertical elements mounted on the bottom of the hydraulic channel, or attached to superstructure or cables disposed above the surfaces of the hydraulic channel, preferably above the level of the fluid flowing in the hydraulic channel, Diverters 110 can be strategically positioned to sequentially divert the victim toward porous surface 5. Alternatively and/or additionally, diverters 110 may comprise vertical elements having cylindrical (or otherwise streamlined) profiles in order to help direct the person or animal caught in the flow towards porous surface 5 with the least turbulence and wasted energy. Alternatively, a diverter 110 may comprise a skirt in the form of a generally continuous barrier to objects, humans and animals, potentially porous, positioned approximately vertically in the channel, and following a diagonal from upstream to the point of entry to porous surface 5 in order to divert victims to porous surface 5. If the diversion is only necessary for victims disposed at (or near) the surface of the fluid flowing in the hydraulic channel, the depth of the skirt can be limited to that which facilitates their access to porous surface 5, thereby economizing on materials and on obstruction to the flow.

Figure 17:
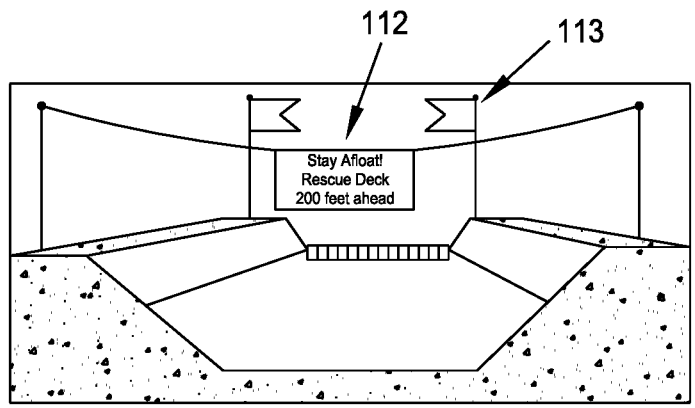
FIG. 17 is a schematic view showing an exemplary sign disposed over a hydraulic channel (e.g., a canal) and exemplary tall visual markers (e.g., pennants) indicating the location of the present invention.
Figure 18:
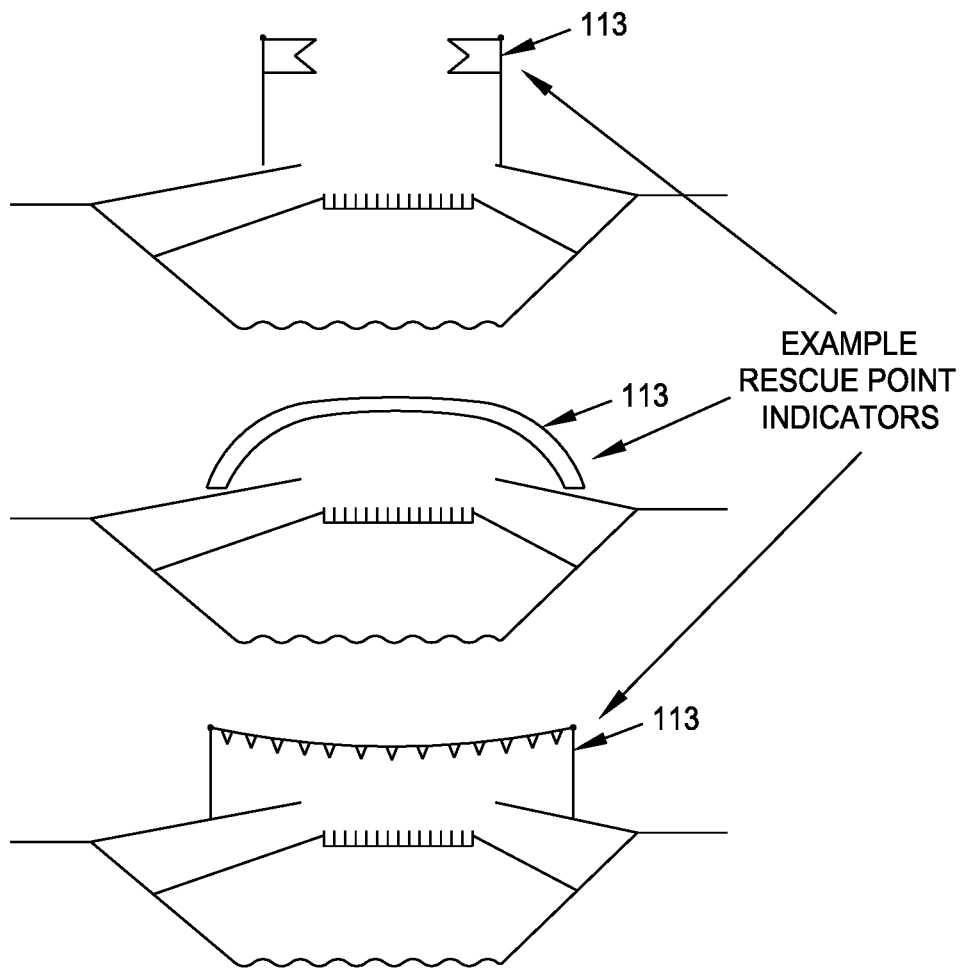
FIG. 18 are schematic views of types of exemplary tall visual markers indicating the location of the present invention.

For victims caught in the flow of the hydraulic channel, it is generally helpful to provide encouragement (e.g., psychological encouragement) and instructions as they are carried by the flow along the hydraulic channel. By way of example but not limitation, and looking now at FIGS. 17 and 18, porous surface 5 can be preceded by signage 112 at one or more distances upstream of porous surface 5, alerting victims using words, symbols and/or images indicating any of the following: the presence of porous surface 5 downstream, the rescue purpose of porous surface 5, what to do to effect rescue, the distance and/or time of arrival from the signage to porous surface 5, etc. Also, since the victim and porous surface 5 do not project high above the surface of the fluid, thereby limiting its visibility to persons floating upstream of porous surface 5, porous surface 5 itself can be accompanied by a high visual element 113 such as a mast or arch potentially with markings or a flag (or pennant, etc.) that can be seen from a distance by a person caught in the flow of the hydraulic channel. A uniform design can be implemented to improve awareness and recognition at each installation of porous surface 5.

In one preferred form of the present invention, the assembly comprising porous surface 5 and support structure 8 for mounting porous surface 5 in the hydraulic channel is manufactured and assembled in a modular fashion. For straight, flat-bottomed channels, a standard support structure 8 and rectangular porous surfaces 5 can be stocked for deployment (i.e., to accommodate essentially any such channel). With such a modular design, only the fluid depth needs to be accommodated by enabling the height of the support structure and/or braces to be customized. For open hydraulic channels having sloped sides, the support structure can be widened with extensions to the central crossmembers, whereby to provide standard configurations for common side slope geometries (and can be further customized in special cases). The support structure for mounting porous surface 5 can be cantilevered from the crossmembers of the standard structure that are in the center of the channel, outward above the sloped sides of the channel, or the support structure can be both connected to the central crossmembers, and terminated in an end cap (modeled after 55, but disposed on the ends of structural crossmembers 7 facing the sides of the hydraulic channel) (or feet) that are weight-bearing on the sloped sides of the hydraulic channel. For wider spans on sloped sides of the hydraulic channels, additional components of the support structure 8 can be disposed to expand the structural support across the breadth of the porous surface 5 in the hydraulic channel and whereby to provide additional support of structural crossmembers 7 above the sloped sides of the hydraulic channel.

Figure 20:
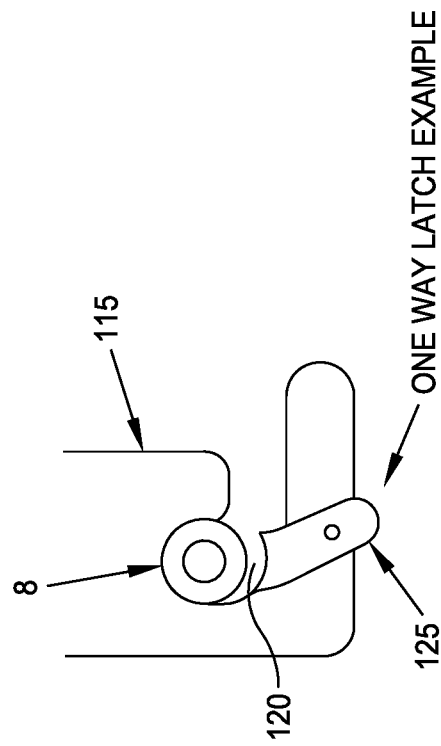
FIG. 20 is a schematic view illustrating details of latch mechanism disposed on tab shown in FIG. 19.
Figure 19:
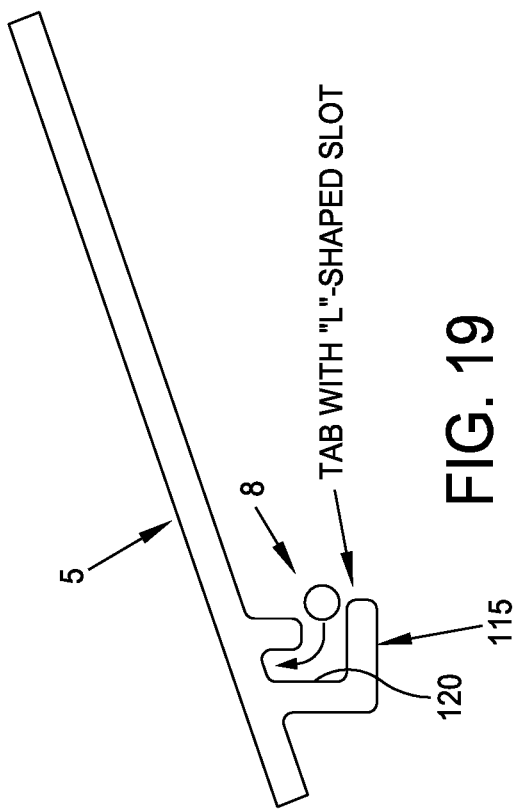
FIG. 19 is a schematic view illustrating a slotted tab mounted to the underside of a porous surface formed in accordance with the present invention.

In order to simplify the assembly of porous surface 5 to the support structure, and looking now at FIGS. 19 and 20, porous surface 5 may comprise one or more slotted tabs 115 descending below the bottom plane of porous surface 5, wherein the tabs 115 are aligned normal to the structural crossmember and contain slots 120 that are preferably approximately L-shaped. In one preferred form of the present invention, the open end of L-shaped slot 120 of tabs 115 face downstream, such that porous surface 5 is positioned with tabs 115 disposed slightly upstream of the structural crossmember 7 and porous surface 5 is lowered to align the slot openings with the structural crossmembers 7; porous surface 5 is then moved in the downstream direction until the horizontal portion of slot 120 captures structural crossmember 7; porous surface 5 is then lowered onto the structural crossmember 7 until the top of the vertical portion of slot 120 is resting on structural crossmember 7 (FIG. 20).

Slotted tabs 115 can be configured to lock porous surface 5 in place with a latch 125 disposed across at least a portion of the opening of slot 120, preferably at the transition between horizontal portion of slot 120 and the vertical portion of slot 120 (FIG. 20) or alternatively as close to the final position of the crossmember 7 in the slot 120. As the crossmember 7 engages slot 120, latch 125 is configured to be pushed away by the motion of tab 115 onto the crossmember 7. Alternatively, the latch can be held out of the way (or removed) during installation, and later restored into position by the installer. Once the crossmember is disposed in the vertical portion of slot 120, preferably at its full insertion point, it is clear of latch 125 which can then be moved back into place. The movement can be deliberate by the action of the installer, effected by gravity, or effected by compression and release (e.g., via a spring). Latch 125 can be disposed so as to be operated with support structural crossmember 7 movement in one direction, and so as to obstruct free movement of structural crossmember 7 in the reverse direction (i.e., out of the slot 120). Latch 125 must be deliberately moved out of the way in order to disassemble the connection between porous surface 5 and the structural crossmember 7.

Escape from, and access to, the rescue apparatus of the present invention may need to be managed in the overall design of the installation of porous surface 5. If the edge (i.e., downstream end 15) of porous surface 5 (where porous surface 5 is disposed above the fluid level) is at a point on the side of the channel where it is easy for a person or animal to exit the channel, additional features may not be necessary. However, the exit from the apparatus and from the hydraulic channel (e.g., canal) may still be steep and/or slippery.

Looking now at FIG. 21, if desired, a ladder, steps, ramp, textured or other climbing surface 130 can be disposed along (or above) the side slope of the channel in order to aid the victim in exiting the channel and/or improve access by rescuers. For animals rescued via porous surface 5, stairs, ramps or other structured sloped climbing surface 130 will be more effective than a vertical ladder. If porous surface 5 is located at an overpass (e.g., a bridge) or other infrastructure, the exit means can be directed to such infrastructure instead of, or in addition to, the banks of the hydraulic channel.

More challenging, perhaps, is the fact that porous surface 5 may constitute an "attractive nuisance" that might invite risky access by persons not requiring rescue. Accordingly, land-side access to porous surface 5 must be controlled in some situations.

To that end, and looking now at FIG. 22, inasmuch as the only portion of the apparatus in need of access control is that which is near (and above) the fluid surface, a short fence 135 may be disposed on the bank coincident with climbing surface 130 (or other egress from porous surface 5 via the bank of the channel) in order to control access to porous surface 5 from the bank. By way of example but not limitation, fence 135 may be configured with a one-way gate 140 from which humans can freely exit from the channel-side to the "bank-side", and to which rescuers can access with an appropriate form of access control (e.g., a key, combination, or special access tool). To discourage climbers from entering the fenced area around the ends of the fence, the ends of the fence can be disposed down the side slope of the channel and positioned close above, at or in the fluid within the hydraulic channel.

Figure 23:
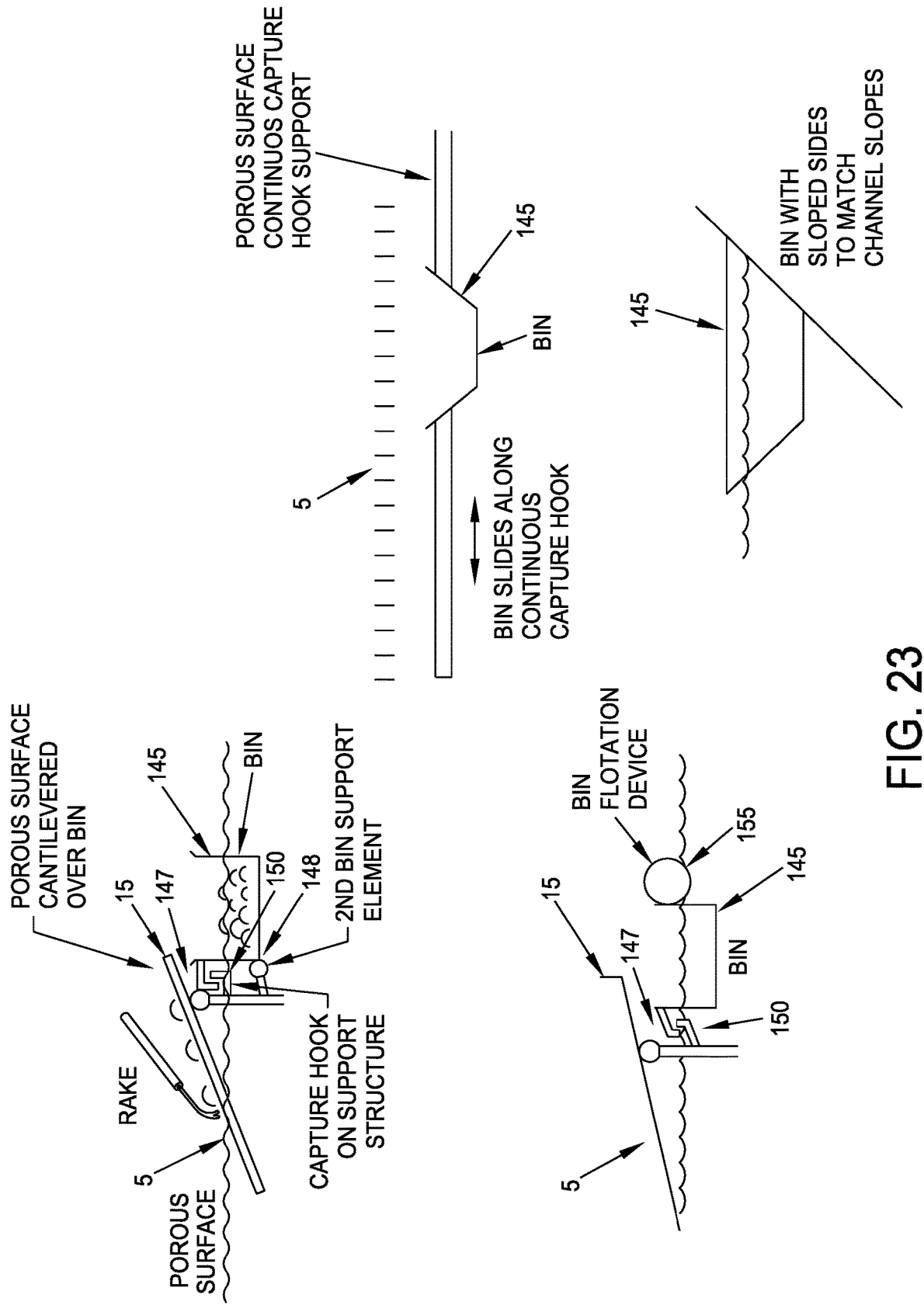
FIG. 23 is a schematic view showing debris capture containers and contact surfaces which may be used in combination with the porous surface of the present invention.

Looking now at FIG. 23, it is anticipated that the apparatus of the present invention (i.e., porous surface 5, support structure 8 to which porous surface 5 is mounted, etc.) will capture debris and require periodic clearing. Other than hand picking debris from porous surface 5, a convenient method of capturing the debris for removal is to rake it manually (or with machinery) toward downstream edge 15 of porous surface 5 and capture the debris in a container 145 whose upstream edge is disposed at, or below, the plane of downstream edge 15 of porous surface 5. Glide surfaces 22 of porous surface 5 will enable smooth ejection of the material into the waiting container 145, especially if the downstream end is not terminated in an end cap. Container 145 can be a shallow fabric (or film or similar material) sling suspended above the surface of the fluid in the hydraulic channel, or container 145 may a deeper container having, if necessary, sufficient density to be partially immersed in the fluid while establishing its rim level at, or below, the level of downstream end 15 of porous surface 5. If desired, container 145 can be a fractional width of the channel (i.e., such that container 145 does not extend completely across the width of the channel), and container 145 may be selectively repositioned along downstream end 15 of porous surface 5 as the debris collection progresses. If desired, a bin support element 150 (e.g., a contact surface such as a bar, angle-bar or rod) can be disposed below porous surface 5 in order to provide a support for the upstream edge of container 145. The bin support element may be disposed as a structure with a horizontal surface for supporting a protrusion on container 145 to bear the weight of container 145. In a preferred embodiment, bin support element 150 is configured as a capture hook or vertical rail to maintain container 145 in place without additional support by the person operating the container. A corresponding inverted hook 147 or rail may be disposed on the upstream side of container 145 to mate with the capture hook bin support element 150. If bin support element 150 is configured to be continuous for a length greater than the width of container 145, container 145 can be slid along bin support element 150 as debris collection progresses. The downstream side of container 145 can be supported by one or more floats 155 in order to provide flotation, thereby allowing container 145 to pivot on bin support element 150 as desired and to maintain an approximately level attitude. Alternatively and/or additionally, if desired, container 145 can be supported by a second bin support element 148 disposed parallel to and below bin support element 150 to maintain the container upright while it is in service. Alternatively, bin support element 150 can be disposed at a location above the downstream end of porous surface 5, such as along a safety railing, with the container suspended therefrom. If desired, container 145 can have sloped sides (FIG. 23) that match the geometry of the sides of the channel, whereby to allow movement across the full span of downstream end 15 of porous surface 5, permitting capture of raked material from the ends of every glide surface 22 of porous surface 5.

Figure 24:
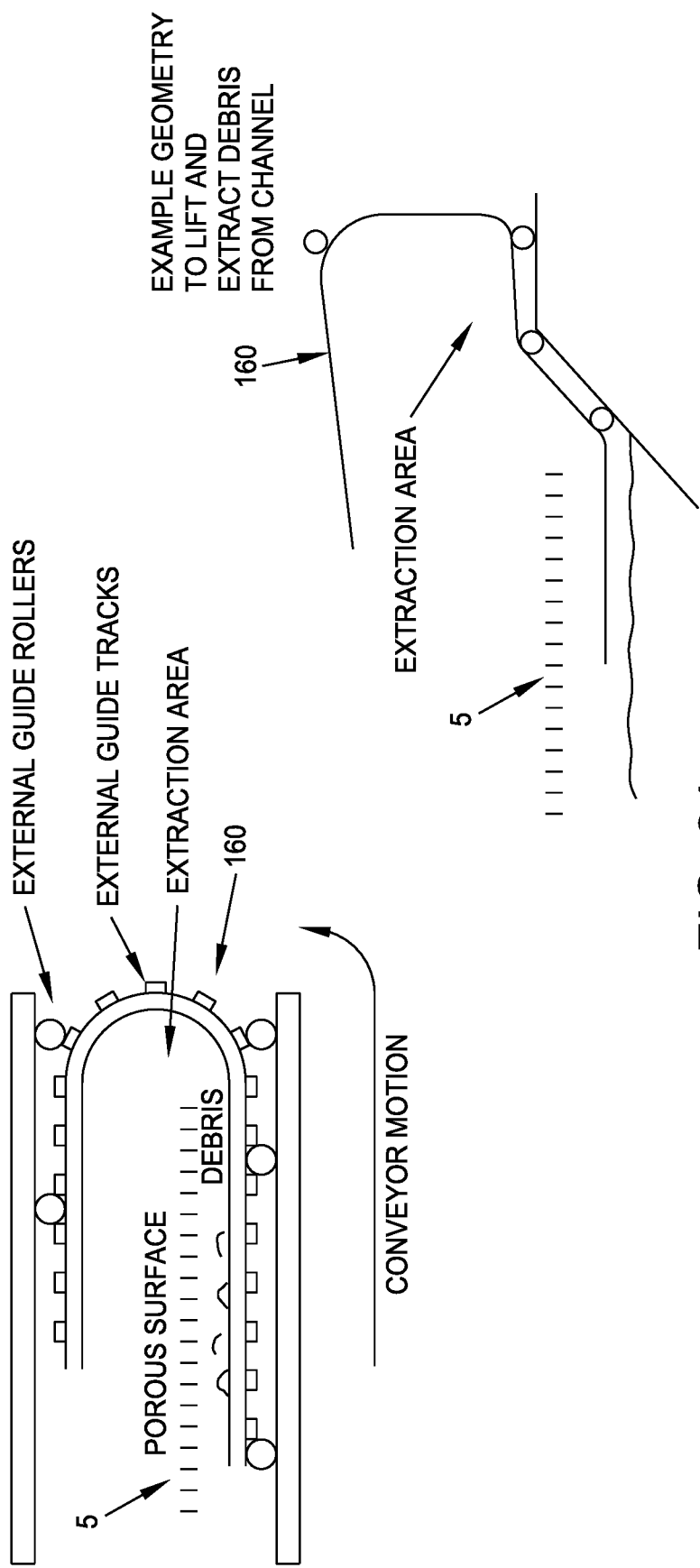
FIG. 24 is a schematic view showing an inverted conveyor system that may be used in combination with the porous surface of the present invention.
Figure 25:
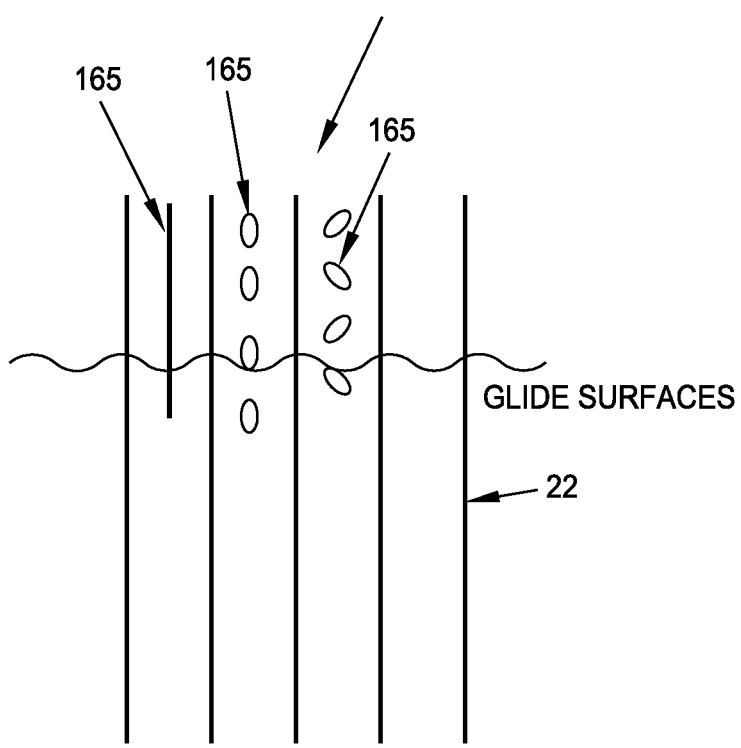
FIG. 25 is a schematic view showing a modified ambulation surface formed in accordance with the present invention.

Conveyor systems have been devised to remove debris from mechanically raked vertical trash racks and surface booms. If desired, and looking now at FIG. 24, a conveyor system 160 can be disposed along the width of the channel at downstream end 15 of porous surface 5. In order to avoid submerging the return path for the conveyor belt of conveyor system 160, the conveyor system could be disposed just above the fluid level, with its inner surface acting as the conveyance surface just above the fluid level, and the return path for the belt is above that. Other features of the specialized conveyor design are articulated in FIG. 24.

It will be appreciated that the rescuing of victims (e.g., persons or animals) caught in the flow of the fluid in the hydraulic channel can be made safer and more convenient by incorporating elements that improve ambulation and security along porous surface 5 where the porous surface extends within the surf zone and above the fluid level. By way of example but not limitation, if the spacing of raised glide surfaces 20 is maintained at a relatively wide span beneath the fluid level to minimize obstruction to flow, additional contact surfaces 165, e.g., parallel glide surfaces or other projections of roughly equal height to the raised glide surfaces, can be disposed within the interstices between glide surfaces 20. This provides more stable footing for humans and animals in the area where victims and rescuers may want to be standing up during rescue (i.e., the portion of porous surface 5 that extends out of the fluid in the direction of downstream end 15). In addition, raised glide surfaces 22 and/or any other surfaces on porous surface 5 can be textured in the above region in order to provide greater friction under foot, as there is less of a need to provide a smooth gliding surface above the anticipated fluid level.

Figure 26:
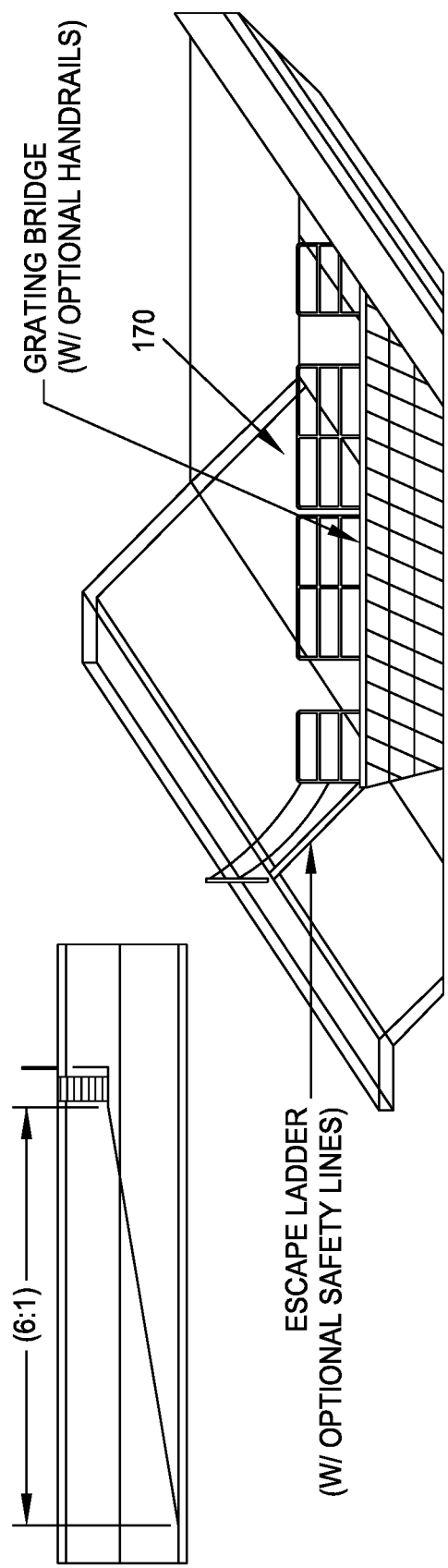
FIG. 26 is a schematic view showing an exemplary railing "overboard prevention" apparatus formed in accordance with the present invention.

Looking now at FIG. 26, it will be appreciated that rescuers and victims can more safely move along the portion of porous surface 5 that is elevated above the fluid level if they are prevented from accidentally falling overboard off downstream end 15 of porous surface 5. To that end, if desired, a railing, fence or other barrier 170 can be disposed along the approximate line of downstream end 15 of porous surface 5 in order to prevent accidental falls downstream into the channel.

Figure 27:
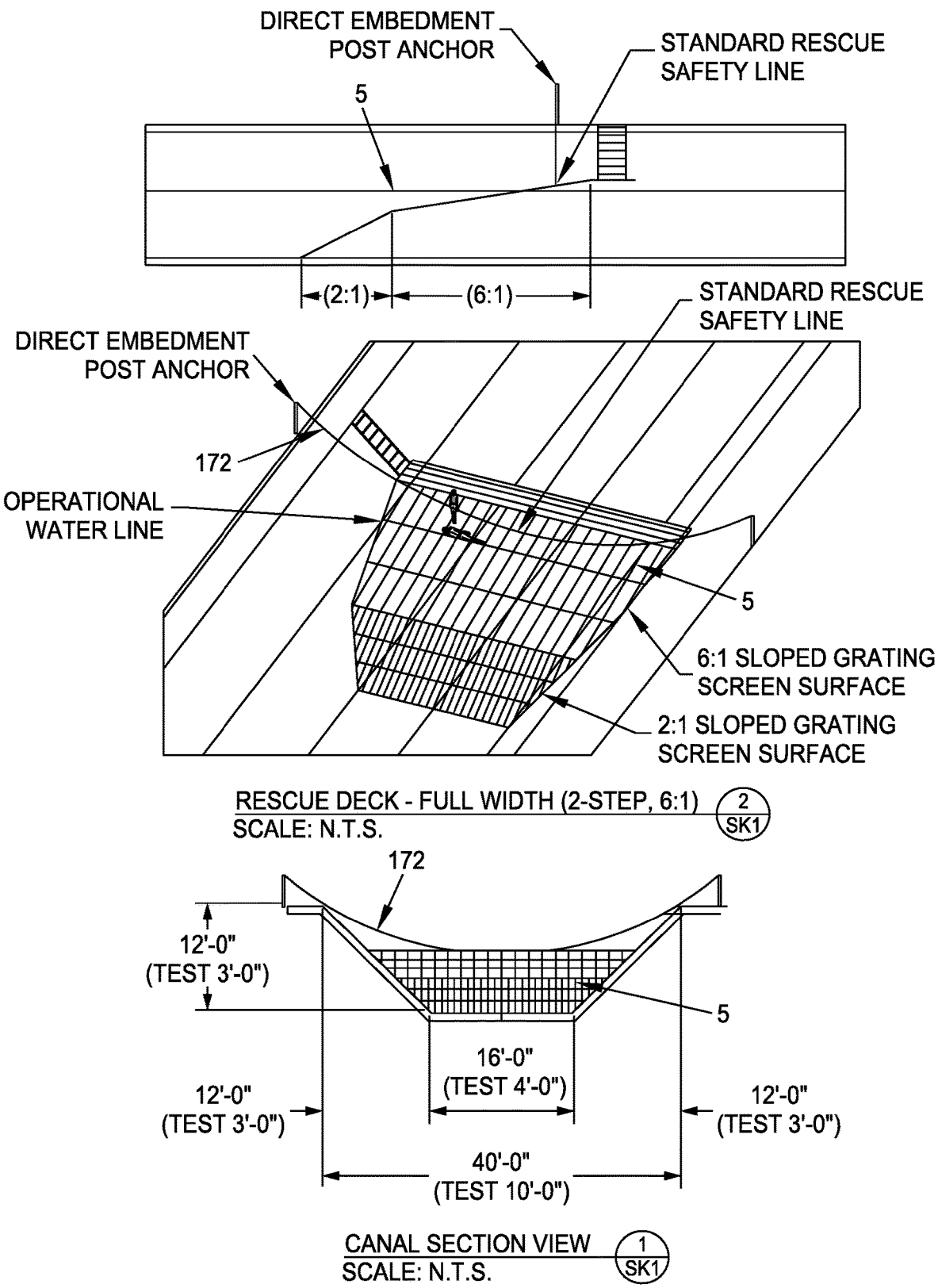
FIG. 27 is a schematic view of a novel safety cable disposed across the hydraulic channel above the present invention to which a properly equipped rescuer attaches a safety lanyard and/or which persons may grasp for security, which optionally has an amount of slack calibrated for maximum movement in the rescue area while preventing movement past the downstream edge of the porous surface.

For rescuers with fall protection gear, and looking now at FIG. 27, a safety cable 172 can be disposed at a convenient height along the width of the porous surface, for instance attached to posts mounted on opposite banks, whereby to enable the rescuer to clip on, and travel along, all (or portions) of the width of porous surface 5, at least above the fluid level and potentially on porous surface 5 to a desired depth below the fluid level and, further, whereby the position of the cable anchoring points, e.g., posts on the bank, and the length of the cable are coordinated to provide freedom of movement of attached rescue personnel in the targeted rescue area of porous surface 5 while limiting the movement of the person attached to the safety cable no farther in the downstream direction than the end 15 of the porous surface.

Figure 28:
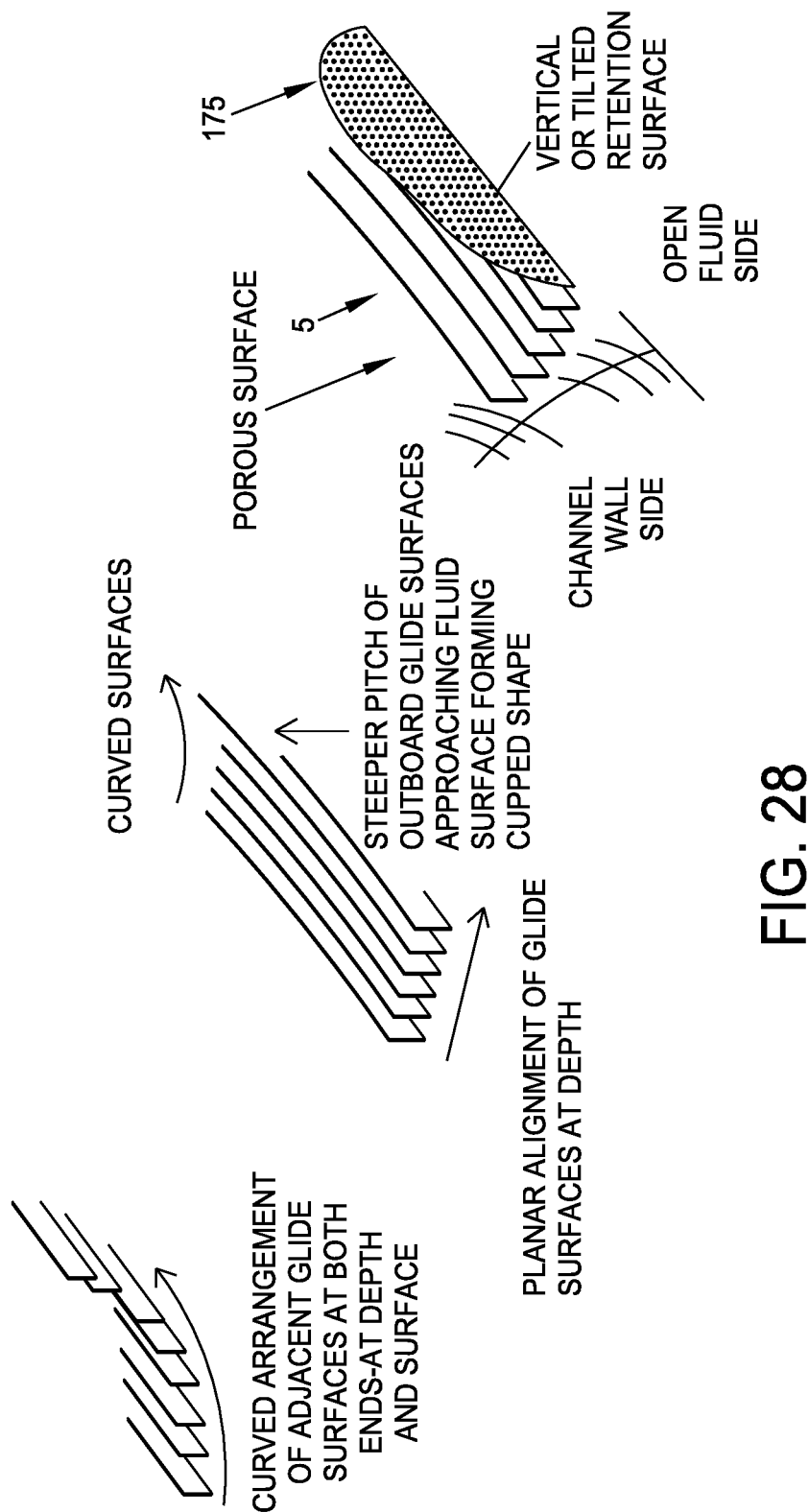
FIG. 28 is a schematic view showing exemplary retention methods utilizing partial-width porous surfaces formed in accordance with the present invention, which retention methods reduce the risk of a human or animal captured by the present invention falling off the side of the porous surface and back into the flow.

If desired, and looking now at FIG. 28, porous surface 5 may be configured as a partial-channel-width porous surface. More particularly, in addition to the use of diverters to convey victim to the narrow access area of a partial-channel-width porous surface 5 discussed above, it may be necessary to prevent the victim from sliding off a side of porous surface 5 before safely landing on a portion of porous surface 5 where the person or animal may be rescued. To this end, a vertical or pitched surface (e.g., a barrier) 175 can be disposed along the side of porous surface 5 facing open fluid in the channel, whereby to retain the victim on porous surface 5. Porous surface 5 can also be contoured by varying the height and/or pitch of the glide structures in order to "cup" the victim away from the open fluid while riding the flow up the porous surface.

Figure 29:
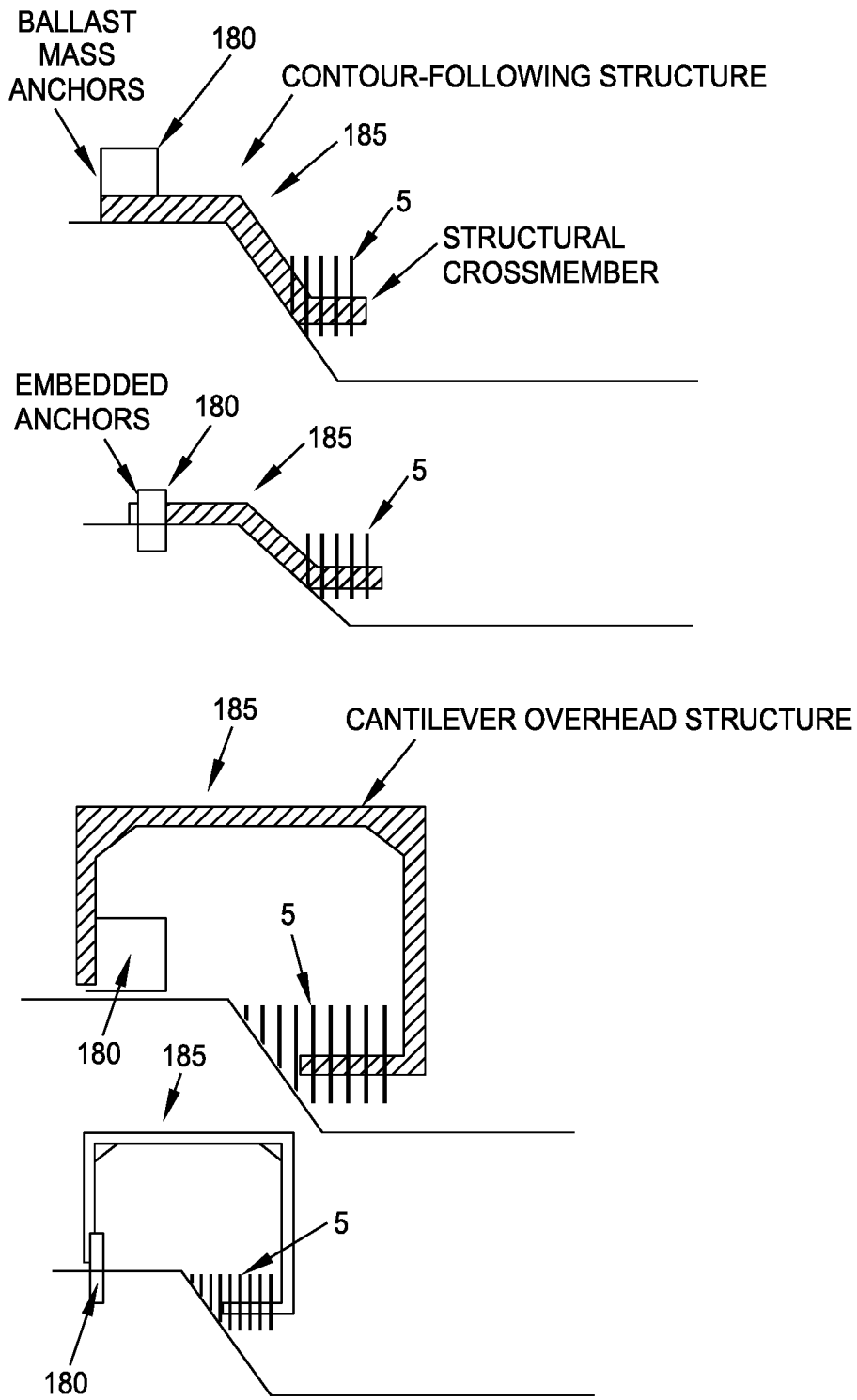
FIG. 29 is a schematic view showing variations on channel-side anchoring of partial-channel-width porous surfaces formed in accordance with the present invention, which may be disposed in ways that avoid penetration of the surface of the hydraulic channel.

If desired, and looking now at FIG. 29, partial-width (i.e., having a width that does not extend across the entire width of the hydraulic channel) porous surfaces 5 can be placed in hydraulic channels with no attachment points penetrating the channel surface. By way of example but not limitation, a channel-side anchor or ballast 180 may be placed beside the partial-channel-width porous surface 5 and structural components 185 extended to porous surface 5 in order to anchor it against the flow. Some of the weight can be relieved by having base surfaces under the porous surface resting on (but not passing into) the channel surface, but with such a configuration, porous surface 5 is preferably cantilevered from the structural components (i.e., anchor or ballast 180) attached to the dry bank.

To temporarily remove the invention from its position of capturing victims and debris, such as to remove the invention's obstruction to the near-surface flow, it may be configured to collapse into the channel.

Figure 30A:
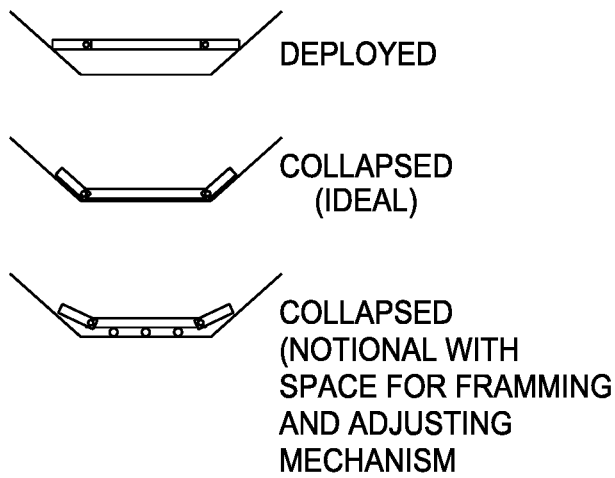
FIGS. 30, 30A and 30B are schematic illustrations of the invention stored flush, or otherwise, near the bottom of the channel showing features used to store in place and deploy the invention.
Figure 30B:
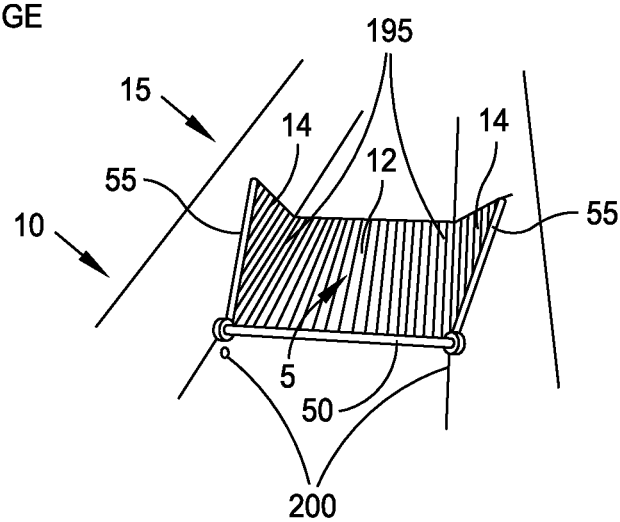
Figure 30C:
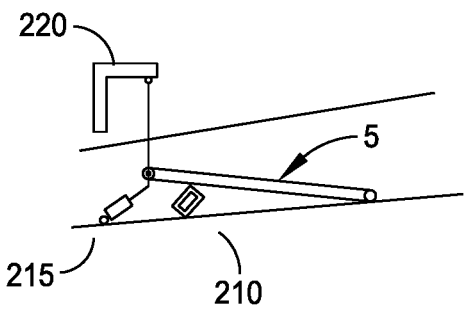

A lifting mechanism may be disposed under 210, downstream 215 and/or above 220 the apparatus (FIG. 30B) to store and deploy it. The lifting mechanism in preferred embodiments may consist of cable lift or jack lift (such as hydraulic or screw jacks in linear, lever or scissor configurations), but the general principles of hoisting the apparatus from the bottom will be evident to those skilled in the art.

The apparatus may be attached to a pivot 200 disposed at or near the bottom of the channel to establish a fixed reference to which the apparatus remains attached when stored, deployed and being hoisted between the two positions. Alternatively, the apparatus may be set in guides that establish the path of the apparatus between the stored and deployed positions.

If the channel has sloped sides and the apparatus is configured to span a sloped portion when deployed, the wings 14 of the porous surface can be articulated with respect to the center section 12. End caps 55 of the wings can be disposed as described above to fit the sloped surface of the channel when the apparatus is deployed. When the apparatus is moved to the stored position, the articulated wing sections 14 may pivot at the seam 195 with the center section 12 or may otherwise disengage to allow different motions for the wings 14 than the center section 12. If the wing 14 remains hinged to the center section 12 along the seam 195, the surface under its end cap 55 surface (that portion in contact with the channel surface edge as the porous surface is moved between stored and deployed dispositions) may be configured to slide on the sloped surface of the channel, such as with rollers or low friction or wear-resistant surfaces.

Modifications Of The Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. Apparatus for facilitating recovery of objects from a hydraulic channel containing a flowing fluid, said apparatus comprising:
   a porous planar surface for disposition within the hydraulic channel, said porous planar surface being elevated in the direction of flow in the hydraulic channel at an angle to a plane extending normal to the force of gravity such that the horizontal component of said angle of elevation is greater than the vertical component thereof;
   wherein said porous planar surface is configured to permit the fluid flowing in the hydraulic channel to flow through said porous planar surface without materially obstructing the flow of the fluid in the hydraulic channel; and
   wherein said porous planar surface comprises:
      a structure defined by:
         an upper surface plane facing away from the bottom surface of the hydraulic channel, and a lower surface plane facing towards the bottom surface of the hydraulic channel; and
         a plurality of raised glide structures projecting above said upper surface plane of said porous planar surface, said plurality of raised glide structures oriented generally in the direction of flow of the flowing fluid in the hydraulic channel wherein the upper surfaces of said raised glide structures define a glide surface plane.

2. Apparatus according to claim 1 wherein the flowing fluid in the hydraulic channel is characterized by a flow axis, and further wherein said plurality of raised glide structures are oriented so as to be within +/−10 degrees laterally of the flow axis.

3. Apparatus according to claim 1 wherein said porous planar surface comprises a plurality of ribs extending in a first direction aligned with a flow axis of the flowing fluid in the hydraulic channel, and a plurality of crossties mounted to said plurality of ribs and extending between said plurality of ribs;
   wherein the upper surfaces of said crossties define an upper an upper surface plane facing away from the bottom surface of the hydraulic channel, and the lower surface of said plurality of ribs define a lower surface plane facing towards the bottom surface of the hydraulic channel; and
   wherein the upper surface of said plurality of ribs projecting above said upper surface plane define a glide surface plane wherein the individual glide surfaces are oriented generally in the direction of flow of the flowing fluid in the hydraulic channel.

4. Apparatus according to claim 3 wherein said plurality of ribs comprise a longitudinal dimension extending parallel to the flow axis of the flowing fluid in the hydraulic channel, a width dimension extending perpendicular to said longitudinal dimension, and a height dimension extending perpendicular to both said longitudinal dimension and said width dimension;
   wherein said width dimension of at least one of said plurality of ribs varies along the height dimension of said at least one of said plurality of ribs.

5. Apparatus according to claim 3 wherein said plurality of ribs comprise a longitudinal dimension extending parallel to the flow axis of the flowing fluid in the hydraulic channel, a width dimension extending perpendicular to said longitudinal dimension, and a height dimension extending perpendicular to both said longitudinal dimension and said width dimension;
   wherein the sum of said width dimensions of the plurality of ribs divided by the total width of the porous planar surface is subtracted from 1 yielding a porosity ratio, and said porosity ratio is reduced at shallower depths by decreasing rib spacing and/or increasing said rib width dimension.

6. Apparatus according to claim 3 wherein said plurality of ribs are spaced together so as to prevent trapping of objects between two adjacent ribs of said plurality of ribs.

7. Apparatus according to claim 6 wherein the spacing between any two adjacent ribs of said plurality of ribs is not greater than 4 inches.

8. Apparatus according to claim 1 further comprising a plurality of porous planar surfaces, wherein:
- each porous planar surface of said plurality of porous planar surfaces comprises:
  - a plurality of raised glide structures extending in a first direction aligned with a flow axis of the flowing fluid in the hydraulic channel, wherein said raised glide structures project above a porous surface comprising an upper porous surface plane which is disposed facing away from the bottom of the hydraulic channel and a lower porous surface plane which is disposed facing toward the bottom of the hydraulic channel;
  - wherein said plurality of raised glide structures are oriented generally in the direction of flow of the flowing fluid in the hydraulic channel and the upper surfaces of the plurality of raised glide structures define a glide surface plane;
- wherein the spacing of said plurality of raised glide structures of a first porous planar surface of said plurality of planar surfaces differs from the spacing of said plurality of raised glide structures of a second porous planar surface of said plurality of planar surfaces.

9. Apparatus according to claim 1 further comprising a plurality of porous planar surfaces, wherein:
- each porous planar surface of said plurality of porous planar surfaces comprises:
  - a plurality of raised glide structures extending in a first direction aligned with a flow axis of the flowing fluid in the hydraulic channel, wherein said raised glide structures project above a porous surface comprising an upper porous surface plane which is disposed facing away from the bottom of the hydraulic channel and a lower porous surface plane which is disposed facing toward the bottom of the hydraulic channel;
  - wherein said plurality of raised glide structures are oriented generally in the direction of flow of the flowing fluid in the hydraulic channel; and the upper surfaces of the plurality of raised glide structures define a glide surface plane;
  - wherein the angle of elevation of a first porous planar surface of said plurality of porous planar surfaces differs from the angle of elevation of a second porous planar surface of said plurality of porous planar surfaces.

10. Apparatus according to claim 8 wherein said first porous planar surface is located closer to the surface of the fluid flowing in the hydraulic channel than said second porous planar surface, and further where the spacing of said plurality of raised glide structures of said first porous planar surface is less than the spacing of said plurality of raised glide structures of said second porous planar surface.

11. Apparatus according to claim 8 wherein the hydraulic channel comprises a path of egress from the hydraulic channel, and further wherein said first porous planar surface is located closer to the path of egress from the hydraulic channel than said second porous planar surface, and further where the spacing of said plurality of raised glide structures of said first porous planar surface is less than the spacing of said plurality of raised glide structures of said second porous planar surface.

12. Apparatus according to claim 1 wherein said apparatus further comprises at least one lateral end cap, said at least one lateral end cap being mounted to ends of at least a portion of said plurality of raised glide structures projecting above said upper surface plane of said porous planar surface.

13. Apparatus according to claim 1 wherein the hydraulic channel comprises a left bank and a right bank, defining the hydraulic channel, and further wherein said porous planar surface is configured to span the full width of the hydraulic channel extending between the left bank and the right bank.

14. Apparatus according to claim 1 wherein at least a portion of said porous planar surface is disposed at a depth that is lower than the center of buoyancy of a human body suspended in the fluid flowing in the hydraulic channel with the head of the body being disposed above the fluid.

15. Apparatus according to claim 1 wherein said porous planar surface comprises a plurality of side edges projecting toward a bank of the hydraulic channel, comprising one or more end caps joining a plurality of raised glide structure ends projecting toward said bank of the hydraulic channel, and further wherein a geometry of said end caps is oriented to match a geometry of said bank of the hydraulic channel, where said end cap contacts the bank of the hydraulic channel.

16. Apparatus for facilitating recovery of objects from a hydraulic channel containing a flowing fluid, said apparatus comprising:
- a porous planar surface for disposition within the hydraulic channel, said porous planar surface being elevated in the direction of flow in the hydraulic channel at an angle to a plane extending normal to the force of gravity such that the horizontal component of said angle of elevation is greater than the vertical component thereof;
- wherein said porous planar surface is configured to permit the fluid flowing in the hydraulic channel to flow through said porous planar surface without materially obstructing the flow of the fluid in the hydraulic channel;
- wherein said porous planar surface is mounted to a support structure disposed in the hydraulic channel, and further wherein said porous planar surface is mounted such that said porous planar surface is disposed at a pitch of less than 10 degrees above horizontal.

17. Apparatus according to claim 16 further comprising a second porous planar surface, wherein said porous planar surface and said second porous planar surface are mounted to said support structure;
- wherein said porous planar surface is mounted to said support structure so as to be located closer to a bottom of the hydraulic channel than said second porous planar surface;
- wherein said second porous planar surface is mounted to said support structure so as to be closer to a surface of a fluid flowing in the hydraulic channel than said first porous planar surface;
- wherein a downstream edge of said porous planar surface and the upstream edge of said second porous planar surface abut to form a breakpoint;
- and further wherein said first porous planar surface is disposed at an angle of elevation relative to a plane extending normal to the force of gravity such that said first porous planar surface comprises a greater angle of elevation with respect to the plane extending normal to the force of gravity than said second porous planar surface.

18. A method for recovering objects from a hydraulic channel containing a flowing fluid, said method comprising:
- providing apparatus comprising:

a porous planar surface for disposition within the hydraulic channel, said porous planar surface being tilted relative to a plane extending normal to the force of gravity such that the horizontal dimension of said angle of elevation of said porous planar surface relative to the direction of flow in the hydraulic channel is greater than the vertical dimension of said angle of elevation of said porous planar surface;

wherein said porous planar surface is configured to permit the fluid flowing in the hydraulic channel to flow through said porous planar surface without materially obstructing the flow of the fluid in the hydraulic channel;

disposing said apparatus in the hydraulic channel such that an upstream end of said porous planar surface is situated below a center of buoyancy of an object carried by the flowing fluid, and such that a downstream end of said porous planar surface is situated proximate the surface of the flowing fluid in the hydraulic channel;

wherein said angle of elevation of said porous planar surface is less than 10 degrees above said plane extending normal to the force of gravity.

\* \* \* \* \*